(12) United States Patent
Eimer

(10) Patent No.: US 6,800,115 B2
(45) Date of Patent: Oct. 5, 2004

(54) METHOD AND A DEVICE FOR GAS TREATMENT

(75) Inventor: Dag Arne Eimer, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 10/168,047

(22) PCT Filed: Dec. 4, 2000

(86) PCT No.: PCT/NO00/00411
§ 371 (c)(1),
(2), (4) Date: Oct. 25, 2002

(87) PCT Pub. No.: WO01/45825
PCT Pub. Date: Jun. 28, 2001

(65) Prior Publication Data
US 2003/0089232 A1 May 15, 2003

(30) Foreign Application Priority Data
Dec. 22, 1999 (NO) .................................. 996410

(51) Int. Cl.[7] .............................................. B01D 53/14
(52) U.S. Cl. .............................. 95/215; 95/218; 95/229; 96/286; 96/359
(58) Field of Search .................. 95/215, 218, 228, 95/229; 96/281, 282, 284, 286, 359

(56) References Cited

U.S. PATENT DOCUMENTS

| | | | | |
|---|---|---|---|---|
| 1,057,613 A | * | 4/1913 | Baldwin ...................... 95/218 |
| 2,252,982 A | * | 8/1941 | Roberts ....................... 96/265 |
| 2,254,600 A | * | 9/1941 | Ditto ............................ 261/87 |
| 2,793,710 A | * | 5/1957 | Robinson ...................... 96/359 |
| 2,941,872 A | * | 6/1960 | Wilhelm et al. ............. 422/259 |
| 3,282,032 A | * | 11/1966 | King, Jr. et al. .............. 96/244 |
| 3,348,363 A | * | 10/1967 | King, Jr. et al. .............. 96/230 |
| 3,474,597 A | * | 10/1969 | Eckert .......................... 96/286 |
| 3,538,657 A | * | 11/1970 | Macrow ........................ 96/286 |
| 3,548,568 A | * | 12/1970 | Carlson, Jr. et al. .......... 95/218 |
| 3,620,509 A | * | 11/1971 | Roman ....................... 261/18.1 |
| 4,294,781 A | * | 10/1981 | Holmquist .................... 261/89 |
| 4,301,860 A | | 11/1981 | Pozzi |
| 4,621,684 A | | 11/1986 | Delahunty |
| 4,660,628 A | | 4/1987 | Solberg et al. |
| 4,934,448 A | | 6/1990 | Uemura et al. |
| 5,076,818 A | * | 12/1991 | Jonsson ............................ 95/9 |
| 5,151,112 A | * | 9/1992 | Pike ............................. 96/281 |
| 5,728,186 A | * | 3/1998 | Jonsson ........................ 96/281 |
| 5,902,520 A | * | 5/1999 | Vezzani ........................ 261/84 |
| 2003/0089232 A1 | * | 5/2003 | Eimer .......................... 95/218 |

FOREIGN PATENT DOCUMENTS

| | | |
|---|---|---|
| FR | 2 091 660 | 1/1972 |
| WO | 89/04448 | 5/1989 |
| WO | 95/24602 | 9/1995 |

* cited by examiner

Primary Examiner—Duane S. Smith
(74) Attorney, Agent, or Firm—Wenderoth, Lind & Ponack L.L.P.

(57) ABSTRACT

A device for treatment of a gas stream includes one or more entities (3) having functional elements (10, 20, 110, 200, 230, 310, 320, 330, 400) that are attached to, and able to rotate with, a hollow axle (4). The device also includes one or more pipes (5) mounted axially inside the hollow axle for transportation of necessary auxiliary fluids to effect the gas treatment.

23 Claims, 23 Drawing Sheets

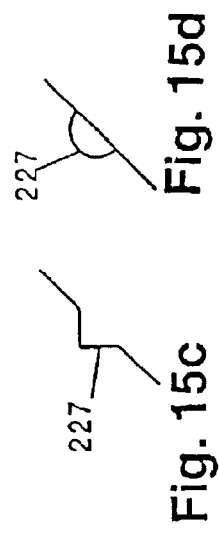
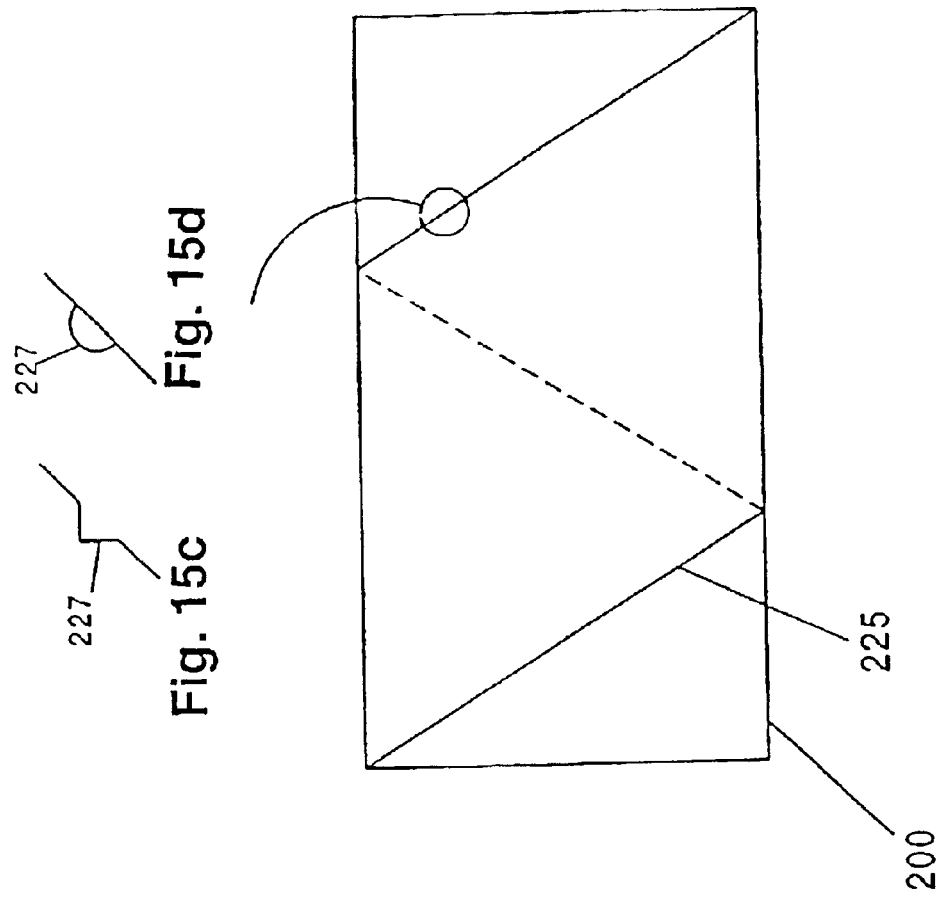
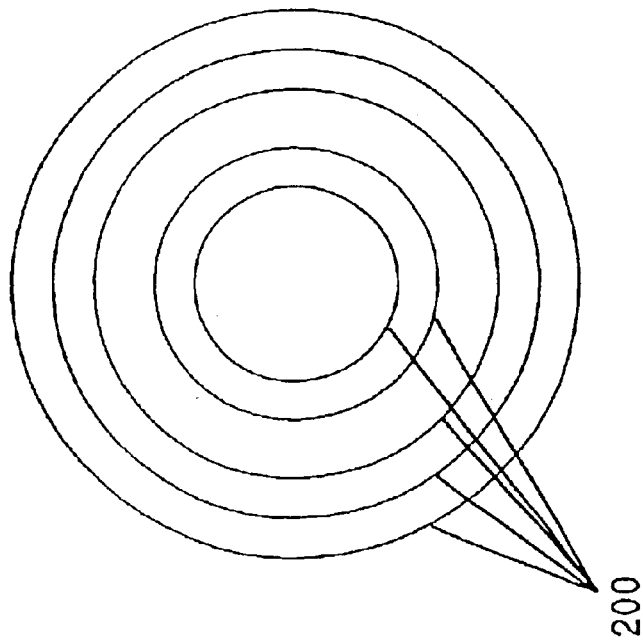

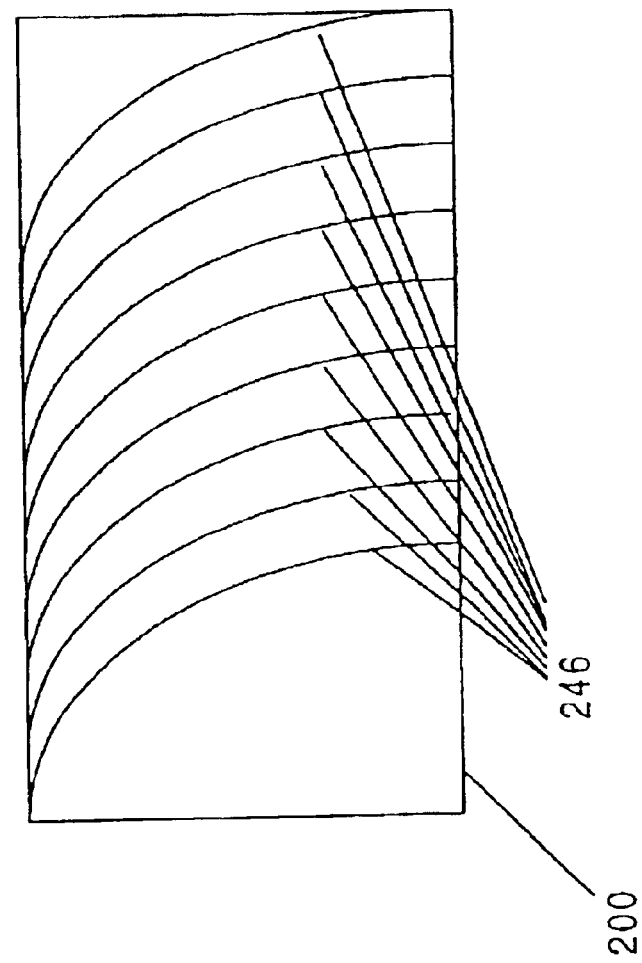
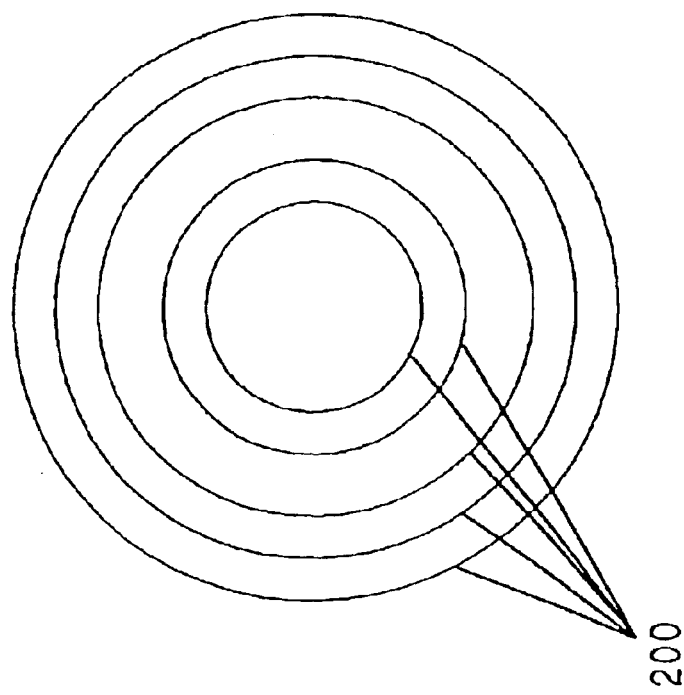
Fig. 17b
Fig. 17a

METHOD AND A DEVICE FOR GAS TREATMENT

BACKGROUND OF THE INVENTION

The present invention relates to a method and a device for treatment of a gas. The invention is particularly applicable for energy recovery and/or removal of $CO_2$ from exhaust or flue gas.

When using gas turbines for converting thermal energy into mechanical energy, it is common to produce steam from the waste heat and use this steam to drive a steam turbine, thus increasing the overall energy efficiency. Adding steam production and a steam turbine to a gas turbine energy conversion process today involves very bulky process equipment. The boiler in particular is voluminous. The piping is also very substantial and complex. In an offshore environment as on an oil/gas platform it is therefore normal practice to install the gas turbine without any device for energy recovery from the exhaust gas since gas is cheap in such an environment while the space is at a minimum.

With the increasing focus on carbon induced global warming and introduction of carbon dioxide or energy taxes, this situation is being revaluated. Increasing the energy efficiency of the process means that less climate gases are emitted. There is also focus on the possibility of sequestering carbon dioxide from the flue gases from such energy conversion plants.

Carbon dioxide recovery demands that the temperature of the exhaust gas is reduced to lower levels than the typical gas turbine exhaust gas temperature of 500° C. Highest temperature allowable for separating carbon dioxide from gas with today's technology is in the region of 100–150° C., but more typical for exhaust gas treatment would be 20–50° C.

When treating the exhaust gas with liquid based methods (e.g. absorption), droplets will usually become present in the gas phase. Droplets may also arise when condensation occurs. Thus it is desirable to remove such droplets either to recover the liquid or to avoid an extra effluent to the atmosphere.

A conventional design for a plant to achieve heat recovery, cooling, and carbon dioxide removal from exhaust gas will embrace a separate boiler, followed by a cooler for the gas before the carbon dioxide is removed in an absorption column with a demister unit downstream, and probably a blower to overcome the ensuing pressure drop. These process units are bulky and require requiring instrumentation and control, in addition to a complex piping system to connect the various units.

It is known from the literature (e.g. Sawyer's Gas Turbine Engineering Handbook, 3rd ed, vol 11, chapters 7 and 14) how the energy recovery problems in gas turbine cycles may be solved technically, but the known solutions are costly in general, and too bulky for applying offshore. Furthermore, these technical solutions are associated with finite pressure drops that will lead to higher gas turbine exit pressure with reduced energy efficiency as a result. Alternatively some kind of blower can be installed to overcome the pressure drop.

It is further known from the literature (e.g. W. W. Bathie, Fundamentals of Gas Turbines, 2nd ed., Wiley, 1996, chapter 8) that gas turbine blades are cooled by internal water flow. The technique as it stands is designed to keep the blade surfaces cool enough to avoid material failure, and is not suitable for efficient heat transfer or energy recovery.

Also known from the literature (e.g. Kohl and Nielsen, Gas Purification, 5th ed., Gulf Publishing, 1997) is how carbon dioxide may be removed from gas by various means. Removal of carbon dioxide from flue gas represents a special problem due to lack of available pressure and the presence of contaminants like nitrogen oxides and oxygen in the gas. One such application is described in the literature (Pauley et al., Oil & Gas Journal, May 14, 1984, pp 84–92). Many developments to improve such technology have in recent years been invested in (see e.g. Greenhouse Gas Control Technologies, edited by Eliasson, Riemer and Wokaun, Pergamon, 1999).

GB Patent No.1,332,684 teaches how heat exchangers may be attached to the rotating assembly of an air compressor combined with combustion chamber and gas turbine. It is shown how heat from the gas turbine exhaust may be used to preheat combustion air via an intermediate heat transfer medium operating in a closed loop including heat exchanger matrices placed in the exhaust gas stream and the air, respectively. The disadvantages of this invention include the creation of a pressure drop in the exhaust gas through using said gas to hydraulically drive the heat exchange assembly, and a limited potential for heat recovery. The physical placement of the heat transfer facility and the created pressure drop will also interfere with the design of the gas turbine assembly. Furthermore, the heat exchanger can not be mounted as a retrofit.

The patents DE 33 26 992, EP 262 295, and EP 556 568 deal with various features of what is essentially the same invention or developments thereof. They teach how an apparatus may be placed in the exhaust duct from any combustion engine, and how that apparatus can be formed to recover heat and kinetic energy from the exhaust gas. Furthermore, they teach how steam may be produced to feed a steam turbine, and how this apparatus may be designed to sit on one rotating axle from which power is transferred to the combustion engine's crankshaft. This invention is intended to increase the efficiency or power output from a combustion engine. The pressure drop induced in the exhaust gas stream is a disadvantage, but less so for a combustion engine than a gas turbine. The narrow flow path of the exhaust gas with or without turbine blades leads to considerable pressure drop. A further disadvantage is that steam is formed in a single chamber such that only one temperature level is possible, thus effectively configuring the heat transfer as cross-flow with the limitation this gives with respect to heat recovery. It is yet a further disadvantage that the temperature of the exhaust gas can not be reduced to a level where carbon dioxide removal can be performed.

WO 98/30486 describes how a compact heat pump may be constructed by combining transport facilitating features like compression and pumping on the same axle. This patent application also describes a heat exchanger in the shape of a spiral wound in a tight annular space where one medium flows inside the spiral tube and the other medium flows in the annular space. This solution will have difficulty in coping with the large gas flows normally associated with handling exhaust gas or large gas based processes.

U.S. Pat. No. 5,363,909 teaches how a gas can be piped into a chamber in which a rotating packing is placed, and where the gas is forced to flow radially towards the center of said packing while being in contact with a liquid moving radially outwards. Cooling or heating can take place by direct heat transfer, but the direct contact would make it impossible to produce useful steam or any other useful heat medium. And it represents separate equipment and a significant pressure drop since the said packing will impart some fan action on the gas trying to force it outwards, and this action must be overcome by extra pressure drop.

SU 1189473 teaches how a gas flow through a column in which concentric discs sloping towards the axis are fixed on the inside wall, and in the center is placed a rotating entity with discs sloping outwards. Liquid flows over the rotating discs and is flung to the wall from where it flows over the static discs back on to the rotating disc below. The apparatus is intended for mass transfer, but by letting the liquid evaporate, cooling of the gas may be effected. Again it is impossible to make any use.

SU 359040 teaches how a gas and a liquid can be contacted by letting the gas flow through a horizontal tank at the bottom of which there is a liquid pool. Liquid is splashed into the gas phase by rotating entities dipping into the liquid and flinging it out in the gas. And the rotating entities are driven by the flow of the gas. Mass transfer may be effected, as above, but the device is of little use in recovering heat from the gas. The mass transfer operation is no very efficient, e.g. with respect to space ($m^2/m^3$).

Further from the literature (e.g. A. Bürkholz, Droplet Separation, VCH, 1989) there are known several methods for removing droplets and/or mist from gases.

Hitherto the technology for achieving heat and mass transfer for large flows of gas has been bulky and costly. If this problem is to be effectively solved, new technology will be needed.

SUMMARY OF THE INVENTION

The main object of the present invention is to provide a compact and multifunctional device for treatment of gas.

The inventor has developed a method and a device for treatment of exhaust gas or flue gas which is a significant improvement upon today's available technology. The device is compact and multifunctional, and it reduces the need for piping by building the device into the exhaust gas duct where heat and mass transfer will be achieved. Optionally some axial movement may be imparted on the gas to avoid pressure drop in the duct, even a negative pressure drop could be foreseen.

The device according to the present invention comprises one or more entities 3 embracing functional elements 10,20, 110,200,230,310,320,330,400 attached to, and which are able to rotate with, a hollow axle 4, and one or more pipes 5 mounted axially inside the hollow axle for transportation of necessary auxiliary fluids to effect the gas treatment.

Furthermore, the method according to the present invention comprises that the gas stream is brought in contact with one or more entities embracing functional elements attached to, and rotating with, a hollow, rotating axle and where necessary auxiliary fluids effecting the gas treatment flow through the functional element in each entity facilitated by pipes mounted axially inside the axle.

The invention reduces the complexity of the gas processing intended by enabling installation of all relevant processing and/or contacting devices in the gas duct itself, thus reducing the need for piping.

The invention comprises one or more entities embracing functional elements mounted on, and able to rotate with, a hollow, rotating axle in the exhaust gas duct, typically from a gas turbine, but the exhaust gas could equally well come from another source. The elements are constructed to combine functions like heat transfer, mass transfer and demisting. The functional elements are also shaped to aid the axial movement of the gas by providing some fan action. The axial movement aid included is basically there to ensure that the device causes no pressure drop by its presence in the exhaust gas duct. The rotation of the entity increases the turbulence around the functional elements, thus increasing the transfer of mass and heat as applicable. Stators may be mounted on the duct wall to improve the axial movement aid efficiency. The axle is mounted in the channel using suitable bearings that are cooled as necessary. The axis of the rotating entity is mounted in parallel to the axis of the gas duct. Said axes may coincide, but not necessarily. Some form of driver is also provided.

The invention is particularly applicable for energy recovery and/or removal of $CO_2$ from exhaust gas or flue gas.

Hot gas in the exhaust gas duct will first be cooled to make steam or superheated steam by flowing through a rotating heat transfer element mounted in the duct as described above. The next step is further cooling of the gas by possibly raising more steam of a lower pressure, and then finally to cool the gas as required. The heat transfer elements needed may be mounted in series on the same axle, or they may be mounted on axles mounted in succession, but they are all intended to be placed in the duct.

The water, as liquid or steam, flows in ducts mounted internally in the axle which is hollow. The water will typically first be heated against the gas leaving, then the heated water will flow back inside the axle and proceed to the next hotter heat transfer element. The water flow through these elements will be partially in parallel and partially in series as beneficial according to heat transfer kinetics, heat recovery, and fluid flow considerations.

Once the gas is properly tempered, it will be lead through one or more entities, partially in parallel and partially in series with respect to the liquid absorbent used, where carbon dioxide in the exhaust gas is absorbed. The liquid absorbent is introduced in the core through the axle and makes its way to the periphery of the gas duct via an entity, or entities, enhancing the mass transfer surface. At the periphery the liquid is collected, drained and processed for recycling.

Downstream of the processing another entity is mounted on the axle, and this entity will act as a demister where liquid droplets entrained in the gas are collected and drained by centrifugal force towards the periphery of the gas duct from where it is collected and drained.

BRIEF DESCRIPTION OF THE DRAWINGS

The invention will be further explained and envisaged in the following figures:

FIGS. 15A–15D show one entity with a packed absorber for axial gas flow.

FIGS. 17A and 17B show how the trays in FIGS. 10 to 14 may be fitted with grooves running in spiral fashion around the tray cylinders.

DETAILED DESCRIPTION OF THE INVENTION

Figure 1:
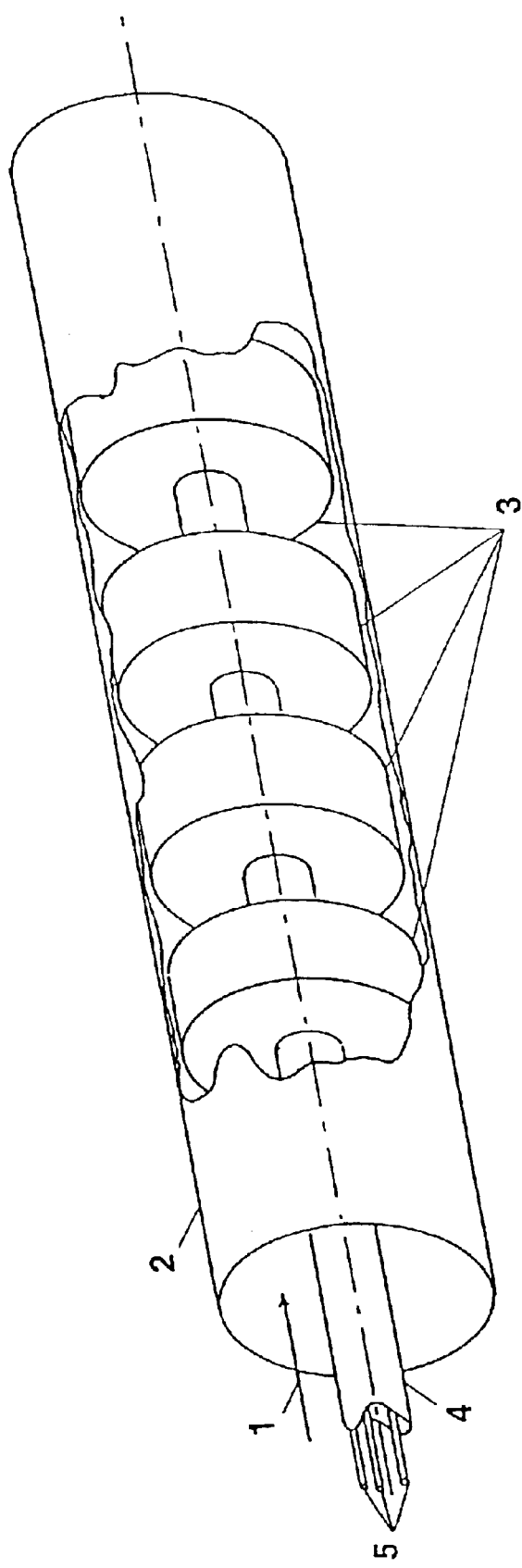
FIG. 1 shows a sketch of the device according to the present invention.

FIG. 1 shows a sketch of the device according to the present invention. Exhaust gas or flue gas 1 to be treated flows through an exhaust gas duct or flue gas duct 2 in which a device according to the present invention 3 is mounted. The device comprises one or more gas treating entities which are mounted on a rotatable, hollow axle 4. Even if FIG. 1 only shows one section of the gas duct 2 depicting four entities 3, it should be understood that there may be more such sections in series, and each section may have any number of entities. Furthermore, there may be any number of functional elements 10,20 in any one entity 3.

Auxiliary fluids (e.g. water or absorption liquid) used for the gas treatment enter and leave each entity through pipes 5 that run axially inside the hollow axle 4. Each entity comprises functional elements suitable for heat and/or mass transfer between the exhaust gas and the auxiliary fluid(s). Demisting facilities may be included with the heat and/or mass transfer, but may equally well be included as separate entities. The design of the various entities will be adjusted according to their intended service.

The device indicated in FIG. 1 is mounted inside the gas duct. The rotatable axle 4 rests in bearing arrangements that serve as necessary support and to facilitate rotation at significant speed without undue friction. The number of support points, and thus bearings, will be determined by good mechanical engineering practice. Bearings will be in houses that are cooled as necessary according to good practice. Each entity 3 in the device may be shaped such that it aids the axial movement of the gas when the entity is rotated, and/or said functional elements may be mounted in such a pattern within the entity 3 that the pattern makes up a shape that imparts an axial force on the gas and thus aids the axial movement of the gas. It is not shown in the figure, but some form of mechanical driver is provided to cause the rotation of the device. Nor does the figure show how the auxiliary fluids are routed in and out of the rotating, hollow axle, but such techniques are well known from the mechanical engineering literature. The axes of the duct and the rotating entity will be in parallel, but not necessarily coinciding.

Figure 2:
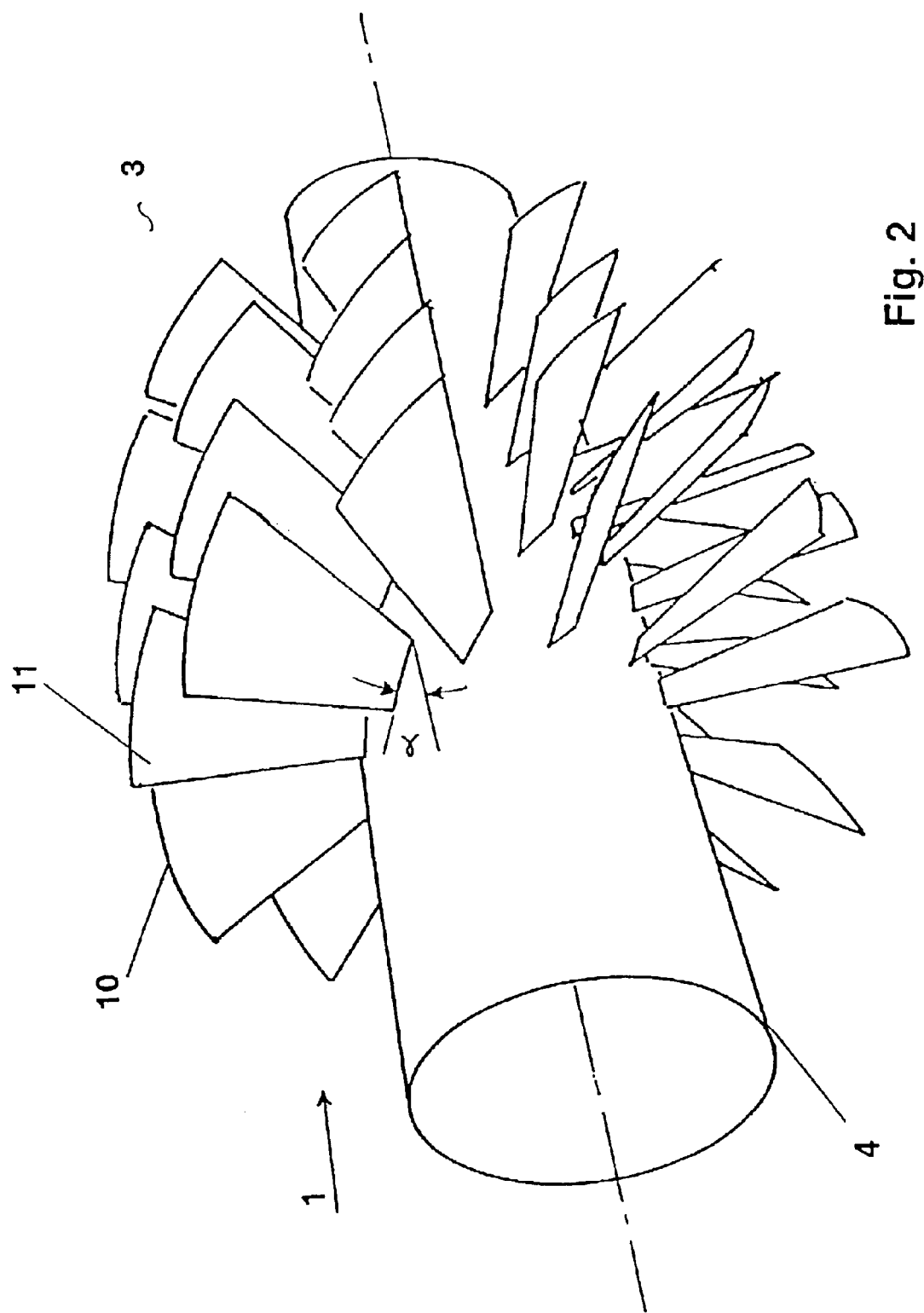
FIG. 2 shows one entity with blade shaped functional elements.
Figure 3:
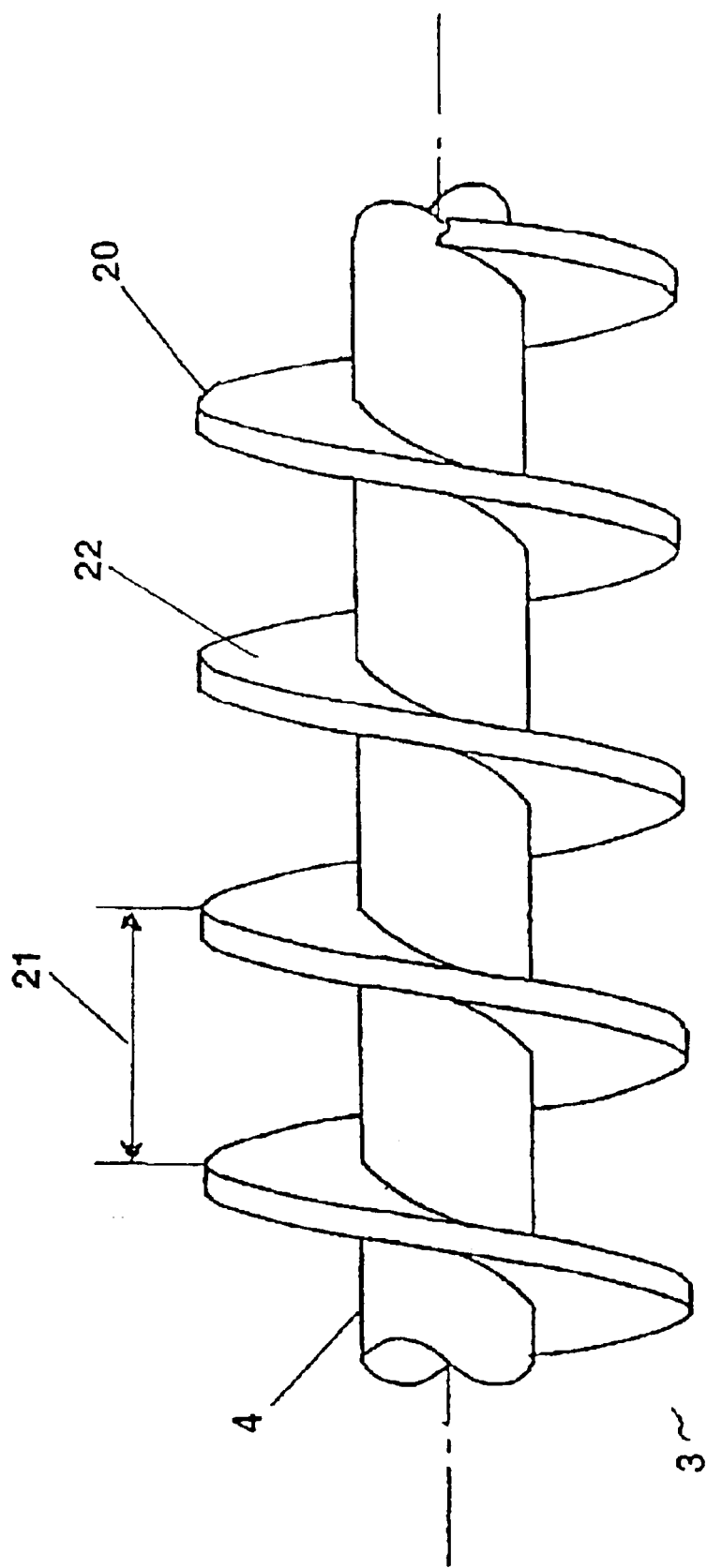
FIG. 3 shows one entity with screw shaped functional elements.

The FIGS. 2 and 3 show two different embodiments of a gas treating entity 3 with functional elements 10,20.

In FIG. 2 the functional elements look like fan blades while in FIG. 3 they look like a spiral vane. The surfaces 11,22 will be chosen according to their service, e.g. metal surfaces for heat transfer and semi-permeable membranes for mass transfer. It is clear from the angle of mounting (the Greek letter alpha) in FIG. 2 or the pitch 21 in FIG. 3 that the functional elements will provide axial movement aid to the gas flowing in the duct. By varying said angle or pitch the fan action may be influenced, as well as the heat and mass transfer process. It is not necessary to only use blade 10 in FIG. 2 or vane 20 in FIG. 3 made of solid sheet. Tubes, or similar, arranged in the same fashion as said blade or vane will give sufficient effects. This will be further explained in the following. These effects may also be influenced by the rotational speed of the device. Some driver (not shown in figures), as explained above, is required to partially or fully avoid a pressure drop in the gas. The choice and arrangement of the driver is not part of the invention.

Given that there is available a sufficient pressure drop for the gas, the functional elements can be used to recover kinetic energy from the gas, thus making the entities rotate without any external driver. The functions would otherwise remain the same. In this case the functional elements provide some turbine, or windmill, action rather than the axial movement aid (fan action) previously referred to.

FIGS. 4 to 7 show a variety of configurations of streams in the device. Further combinations of these are possible.

Figure 4:
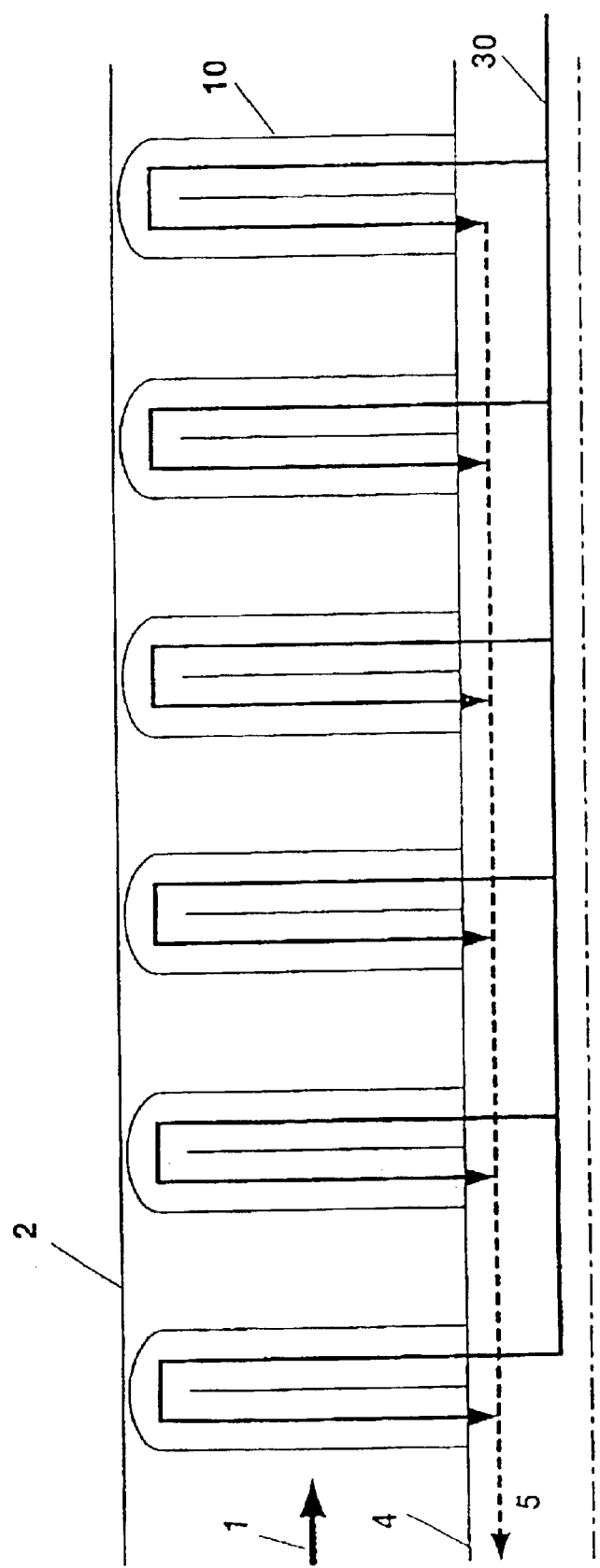
FIGS. 4–7 show alternative routes of auxiliary streams in the device according to the present invention.

FIG. 4 shows how an auxiliary fluid stream 30 is piped in parallel between the functional elements 10 on the hollow axle 4, whereafter the treating fluid streams are rejoined in one common outlet stream through internal pipe 5 in the hollow axle 4. The treating stream 30 is here in crossflow to the gas stream 1 when viewing one functional element 10, and the gas 1 passes said elements in series as mounted. The treating stream 30 may be boiler feed water, cooling water, or an absorbent to pick up specific component(s) from the gas 1, or the treating stream may simply be the permeate stream in the case where the functional element 10 incorporates a membrane. This membrane may take the form of a plain sheet, or it may be built up by having hollow fibre membranes mounted side by side (like logs in a raft) with stiffening elements as necessary to ensure mechanical robustness.

Figure 5:
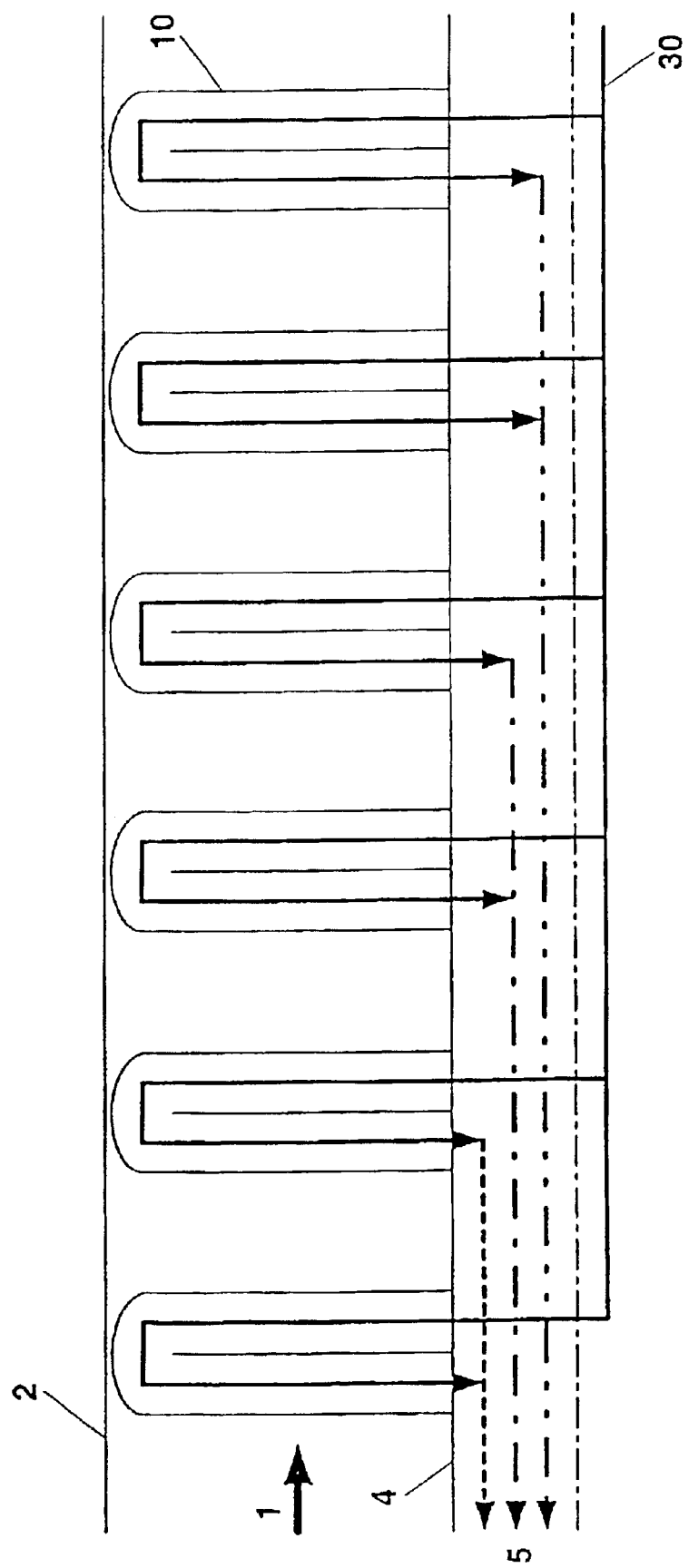

FIG. 5 shows a variation where functional elements 10 are fed by the treating stream 30 in parallel, but where the treating streams are segregated downstream of the functional elements 10 to provide a plurality of qualities of the used treating stream as shown. For example, the three streams depicted may from bottom to top be hot water, low pressure steam, and high pressure steam. This arrangement is a better approach to countercurrent flow than the arrangement in FIG. 4. The FIG. 5 arrangement would be advantageous if e.g. the treating stream is water, and portions of the water are thus rendered available at higher temperature levels.

Figure 6:
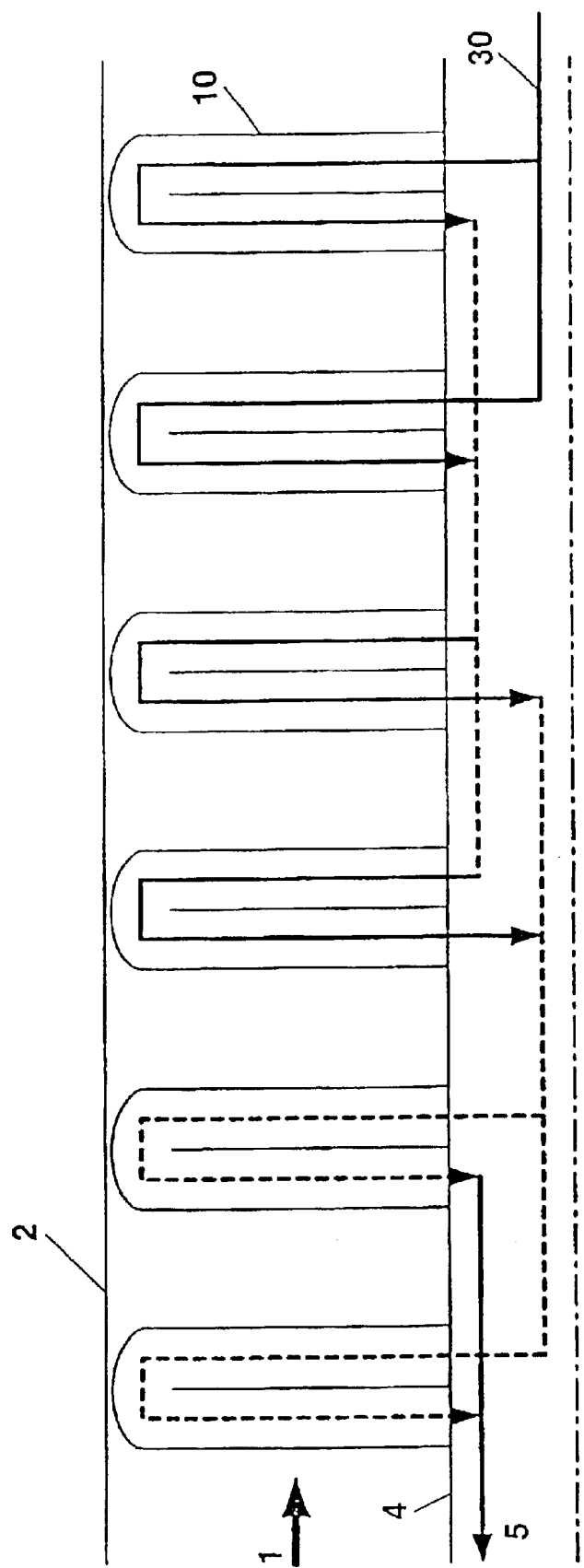

FIG. 6 shows an arrangement where the treating stream 30 is partially piped through the functional elements 10 in series and partially in parallel. This is a further approach to countercurrent flow between gas 1 and the treating stream than was seen in FIG. 5. If the treating stream e.g. is water, this would capture the maximum energy from the gas, in case of cooling the gas flowing in the duct, at the highest temperature level thus giving a better energy quality according to the second law of thermodynamics.

Figure 7:
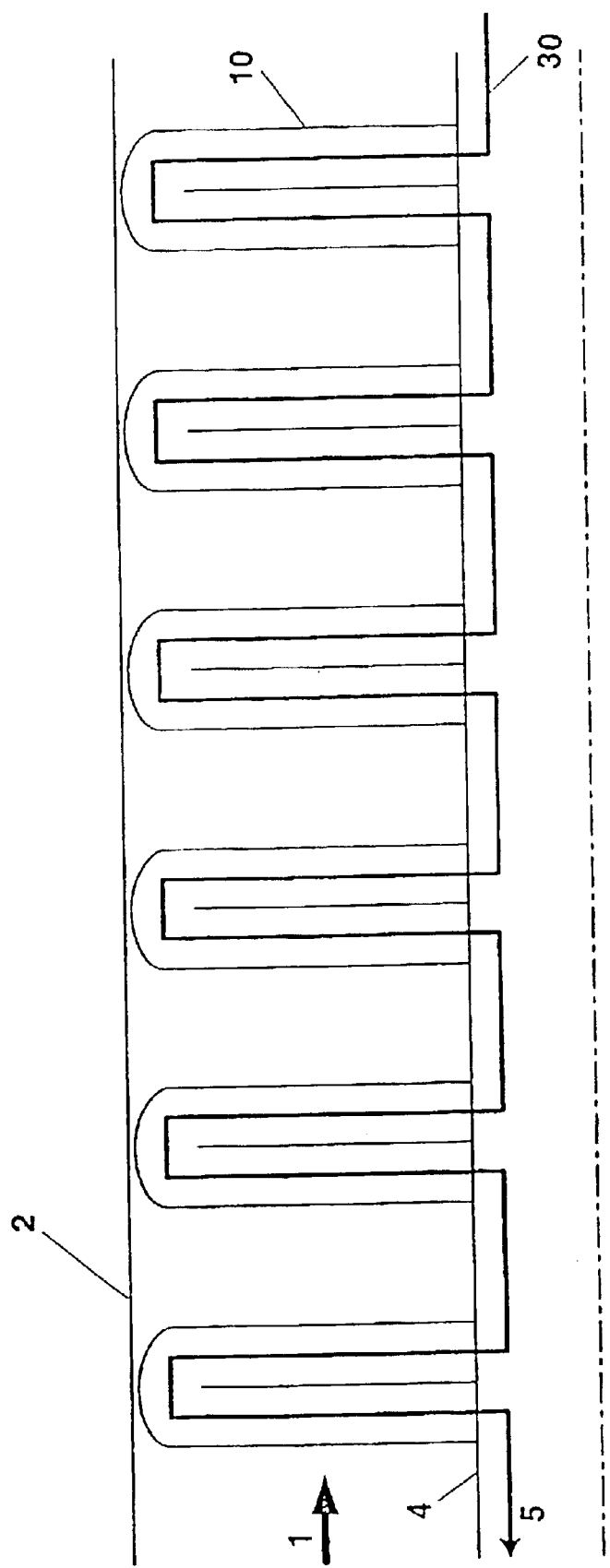

FIG. 7 shows an arrangement where the treating stream is piped through the functional elements in series. This is an even better approach to countercurrent flow between gas and the treating stream than was seen in FIG. 6, but this option has a more limited capacity for the treating stream flow rate.

It is understood that the gas 1 and the treating stream 30 will always be in a cross-flow configuration when only one functional element is considered. Countercurrent flow can only be approximated, and this approximation to countercurrent flow becomes better the more functional elements are placed in series.

Although FIGS. 4 to 7 all show six functional elements, it must be understood that this is only chosen as one example for illustration purposes. More or fewer functional elements are also within the scope of the present invention. The choice of the number of parallels is largely determined by fluid flow considerations for the treating fluid, but not without due attention to the treating of the gas to be achieved. The choice of the number of functional elements in series is largely determined by the need for treating of the gas, and the quality of the treating stream. This is most easily illustrated by the example where the gas needs cooling and the auxiliary fluid stream is cooling water. In this case it would be normal to choose a high degree of countercurrent configuration to minimize the water flow, and to recover the heat at as high a temperature as possible with due regard to the cost of heat transfer surface. The term "cooling water" could here embrace the term "boiler feed water".

The choice of the number of functional elements in series is largely determined by the need for treatment of the gas, and the quality of the absorbent. This is most easily illustrated by the example where carbon dioxide in the gas needs to be removed and the absorbent is water. In this case it would be normal to choose a high degree of countercurrent configuration to minimize the water flow, and to cycle the absorbent to the desorption step at as high a carbon dioxide loading as possible with due regard to the cost of mass transfer surface.

Figure 8:
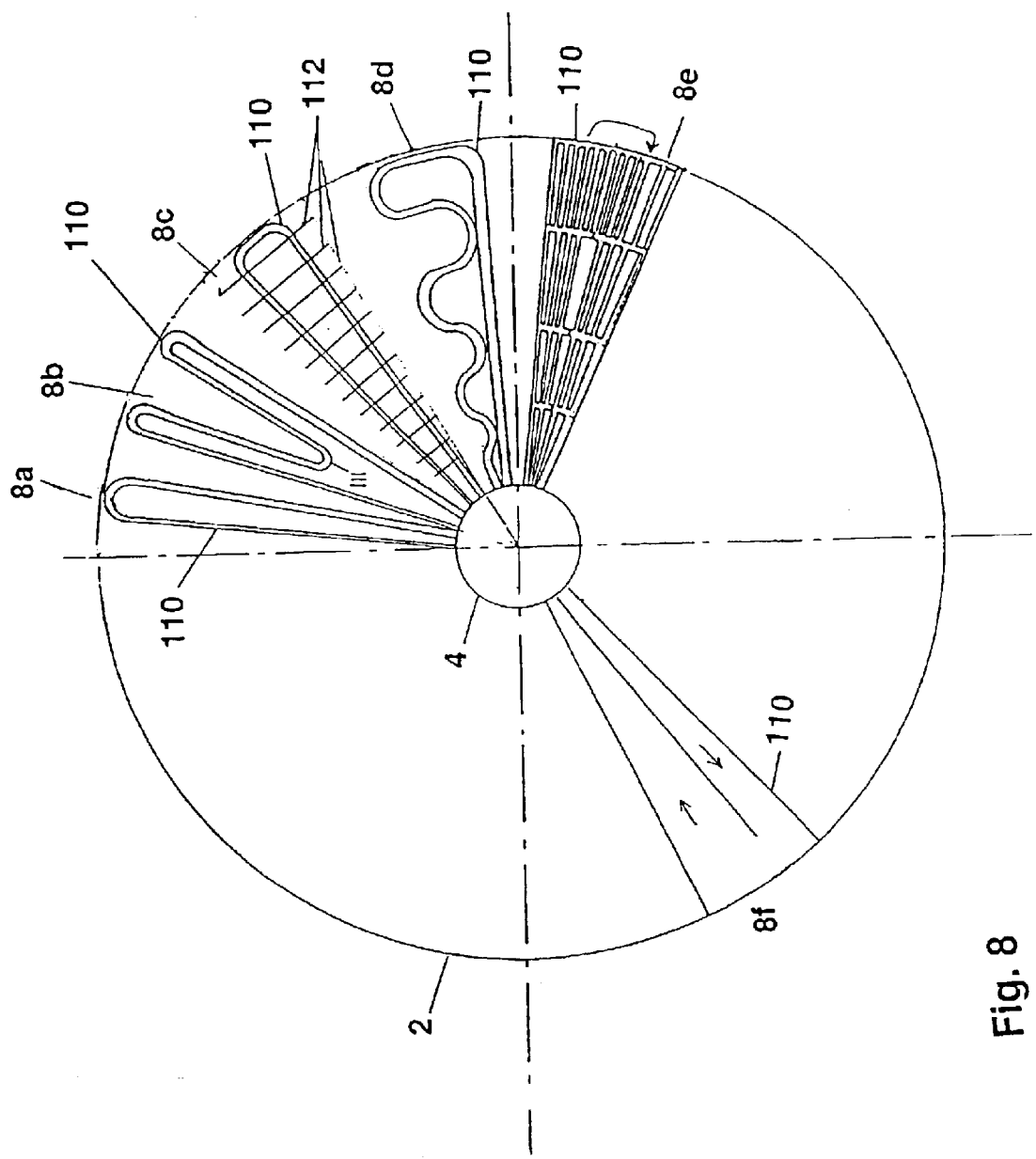
FIG. 8 shows different embodiments of a heat exchanger functional element.

FIGS. 8 and 9 show different embodiments of the functional elements utilized for heat transfer.

FIG. 8 shows a number of variations 8a–8f with respect to design of the functional elements 110 dedicated to heat transfer. The variations show different approaches to how the increased perimeter as radial distance increase may be utilized to add more heat exchange surface. Ideally, any variation is designed to achieve the same specific heat exchange surface density ($m^2/m^3$) irrespective of the radial distance from the rotational axis.

8a depicts the effect on the specific heat exchange surface density if no steps are taken to increase the said density towards the outer perimeter. A simple U-tube hoop as shown will not be a very space efficient functional element.

8b shows how the specific heat exchange surface density may be improved by adding an extra, inverted, U-tube 111 to the U-tube 110. Further U-tubes may be added as space allows.

8c shows a simple U-tube hoop with fins added to act as secondary heat transfer area 112. Fins may also be added to the more complex U-tube hoop depicted in 8b, or any of the other depicted variations 8a to 8f inclusive.

8d depicts a U-tube hoop where one leg, e.g. the outgoing, is shaped in snake fashion to fill the available room with as much tubing as possible. The other leg could be similarly snaked, and the two snaked tubes may be placed in separate planes.

8e shows a cobweb-like arrangement where an increasing number of channels are added as the distance from the rotational axis is increased. The various radial channels serving the outgoing stream are cross-connected, most conveniently at a perimeter where the number of channels change. Similarly the ingoing channels decrease in number towards the rotational axis. This helps to increase the specific heat exchange surface density.

8f depicts a hollow blade-like functional element where the specific heat exchange surface density is naturally built in. Internal channels are shown. If evaporation takes place, it is prudent to provide a larger cross-section in the channel arm carrying the more voluminous vapor flow.

Not shown in the figures, since it is impossible to depict, is how the surface may be enhanced through various means such as etching, grooving and/or, fixing metal droplets or particles to the heat transfer surface in order to increase the effective surface area or increase heat transfer film coefficients. This is primarily done on the side of the exhaust gas flow (shell-side) where the lowest heat transfer film coefficients are expected, but in principle this may also be done internally in the channels of the functional elements where the auxiliary heat transfer fluid(s) flow(s).

The different embodiments depicted in FIG. 8 are all intended to increase the heat flux per unit volume of heat exchanger equipment.

Figure 9B:
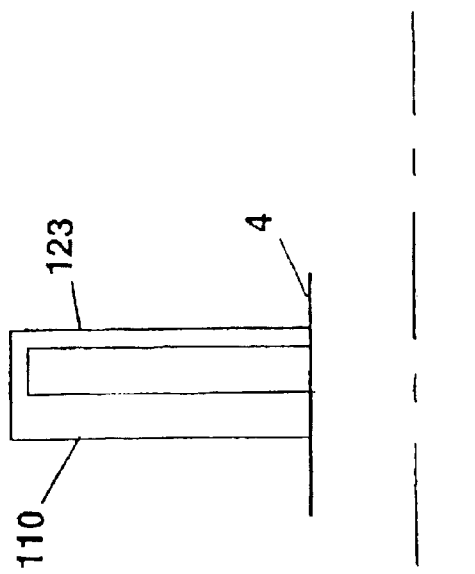
FIGS. 9A and 9B show another version of functional element depicted in FIG. 8.
Figure 9A:
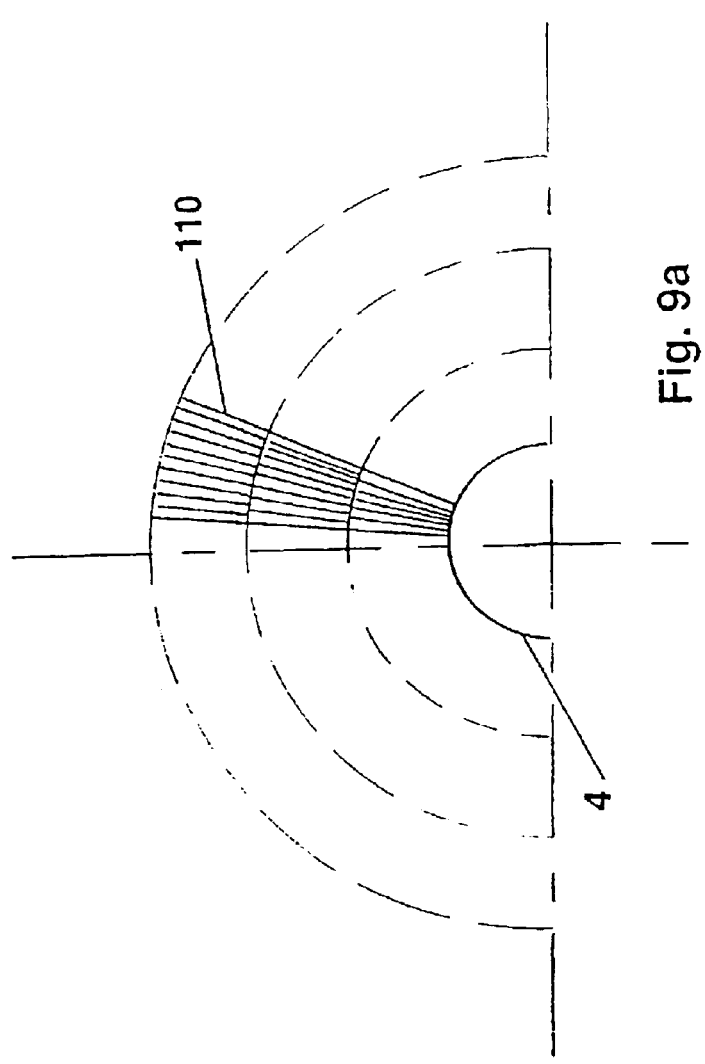

FIG. 9 shows another version of the functional element 10, 110 depicted in 8e where all the channels in the cobweb-like channel pattern lead the heat transfer fluid radially outwards, while the same fluid is returned to the axle through a separate pipe 123. FIGS. 9a and 9b represent two different side views at 90 degrees to each other. In the case of steam production, this configuration should make steam flow easier. FIG. 9 and 8e are extremes in this respect. Combining these two basic concepts may be done. The variation depicted in FIG. 9 may be used with any of the variations depicted in FIG. 8 as judged beneficial.

FIGS. 10 to 17 show different embodiments of the functional elements utilized for mass transfer.

Figure 10:
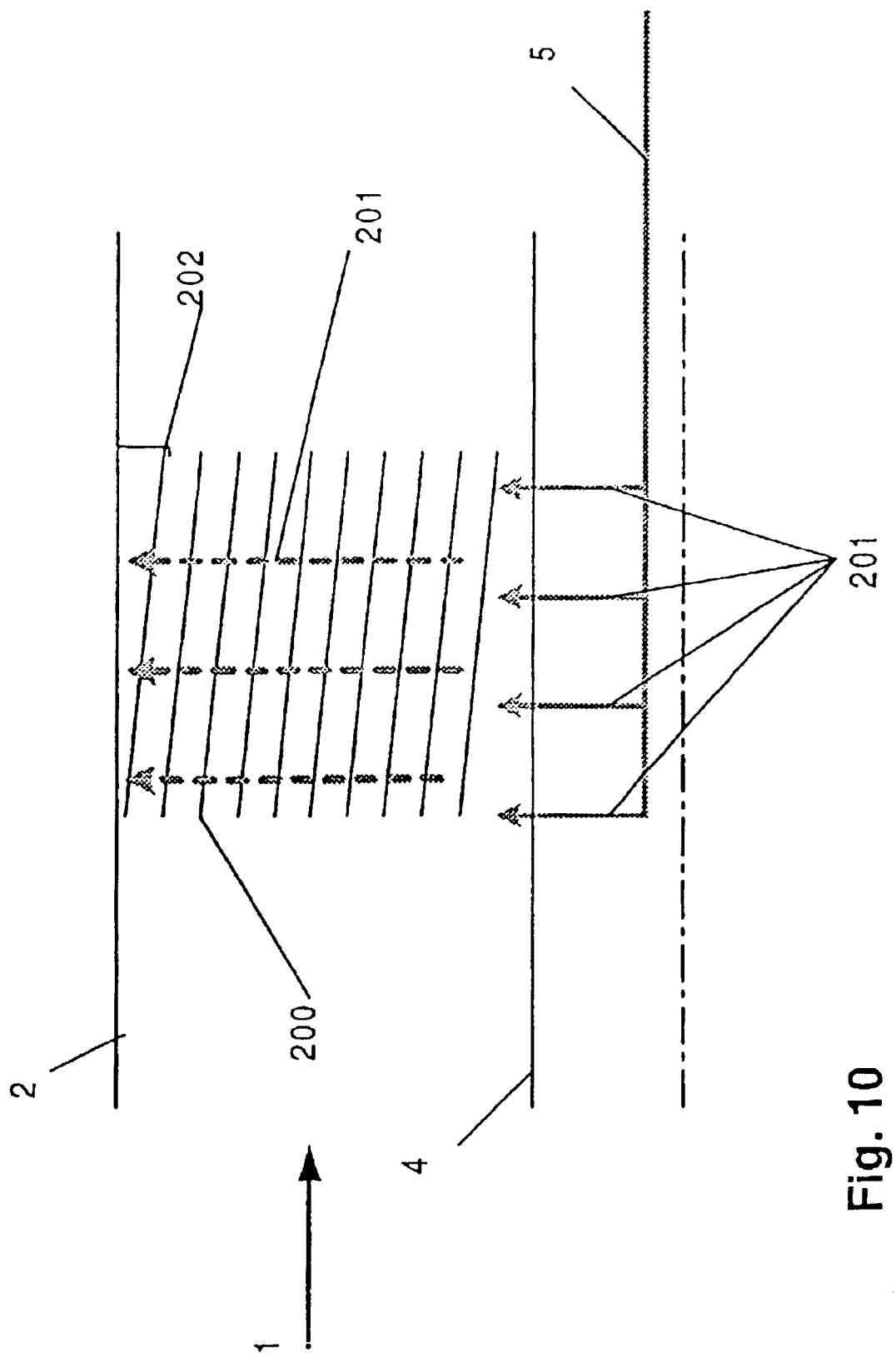
FIG. 10 shows a side view of an entity for absorption where the functional elements are co-axial, perforated trays shaped as cut cones.

FIG. 10 shows a set of co-axial, perforated trays 200, shaped as cut cones, mounted in a gas duct 2, where a gas 1 flowing axially is treated with liquid 201 moving radially towards the perimeter of the duct as shown. The auxiliary liquid 201 is supplied through an internal pipe 5 in the hollow axle 4. The internal pipe has at least one pipe connection through the wall of the hollow axle from where liquid is sprayed on the innermost co-axial tray. Arrangements are made for the liquid to be basically evenly distributed in the axial direction and similarly with respect to the angle of rotation, but this arrangement is not shown as the details are not part of the present invention. Nor is it shown how the co-axial trays are fixed in relation to the axle, but this may easily be done with use of appropriate stays. The liquid is collected at the periphery of the gas duct 2 where a ring with a lip 202 mounted on the duct wall prevents the liquid from moving axially along the wall. Auxiliary liquid 201 may drip from the duct "ceiling" back on to the outer tray from where it will be flung back on the duct wall, and eventually it will reach the duct's lowest point from where it may be drained.

Figure 11:
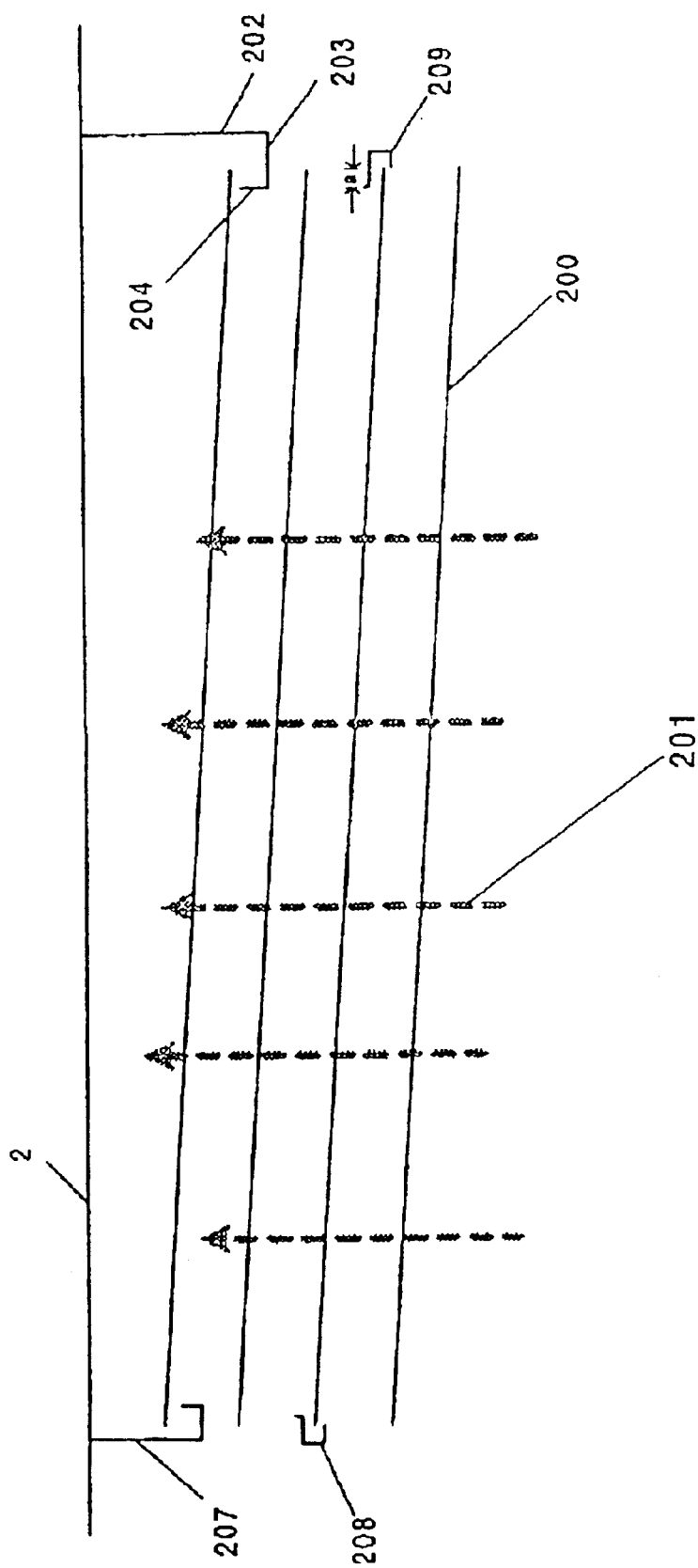
FIG. 11 shows details of the co-axial trays in FIG. 10.

FIG. 11 is an enlargement of a part of FIG. 10, and FIG. 11 shows how the ring 202 has a lip 203 mounted axially in the duct, and another lip 204 mounted radially, and how these lips overlap with the most peripherally placed tray 200. The ring 202 and the lips 203, 204 make up a channel for liquid collected at the periphery of the co-axial tray arrangement, and this channel enables the liquid to flow gravimetrically towards the bottom of the duct from whence it may be drained for recycling. Liquid will also splash on to the inner wall of the gas duct 2 and make its way to the duct's bottom without coming into the liquid drain channel made up from the ring 202 and the lips 203,204. It is clear from FIGS. 10 and 11 that the co-axial trays are shaped as cut cones with the widest part at the end where the gas enters. This is to utilize the centrifugal effect to move treating liquid 201 back upstream with respect to the gas flow after the axial velocity component of the gas causes the treating liquid to move downstream while moving from one tray to the next. Another set of lips and ring 207 may be added at the gas upstream end of the tray to catch liquid splashing there. The trays may also be equipped with back drip collection lips 208 as shown in FIG. 11. The function of this feature is to catch liquid spun off the tray at its wider end if it rotates too fast in relation to the absorbent management. Similarly, another set of drip collection lips 209 may be mounted on the downstream end (with respect to gas flow) of the trays to catch liquid flowing on the tray because of the gas wind impact when the rotational speed of the trays becomes too low to drive the liquid upstream. The mounting of the back drip collection lip is e.g. by a stay connecting it to the tray 200.

Figure 12:
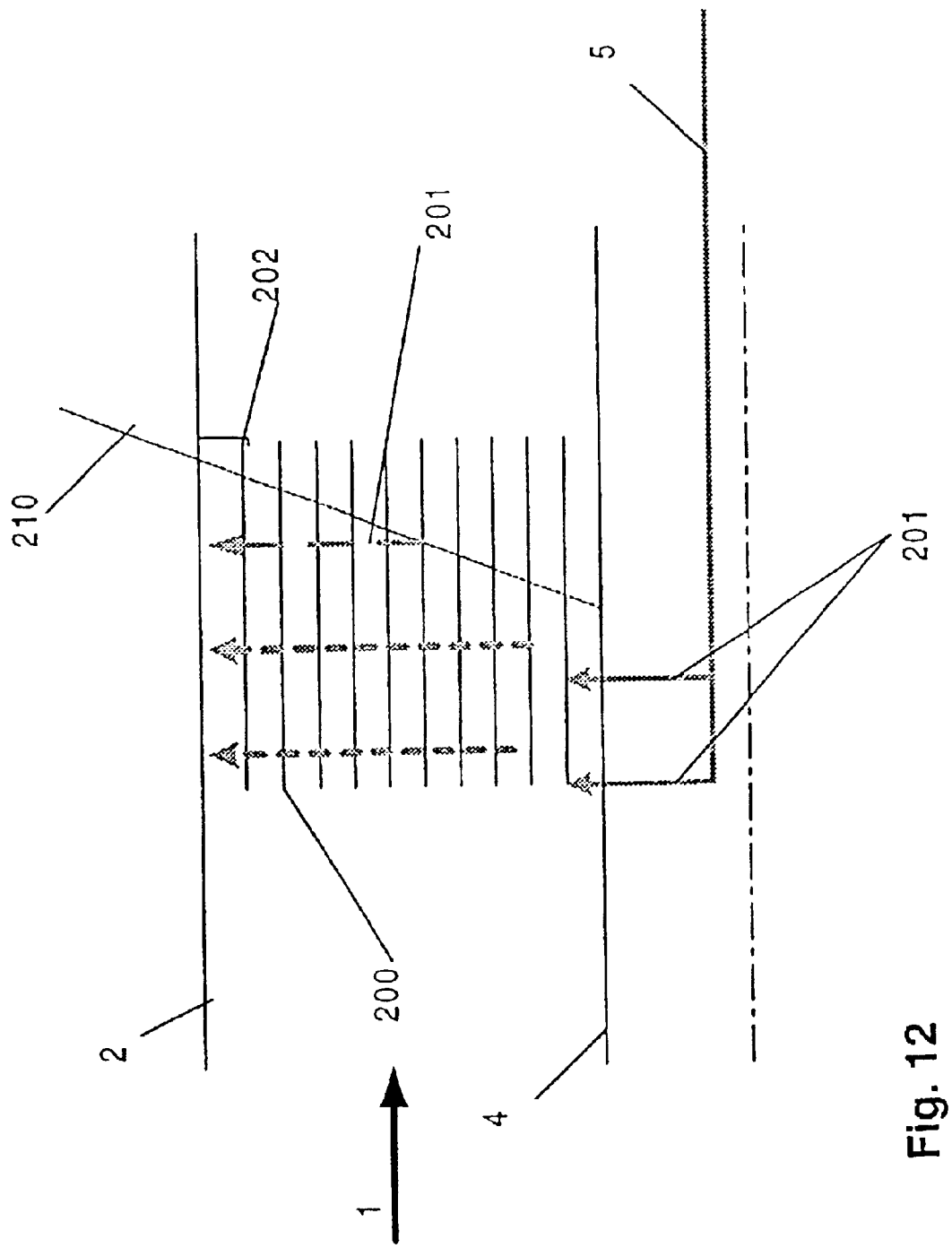
FIG. 12 shows a side view of an entity for absorption where the functional elements are co-axial, perforated trays shaped as cut cylinders.

FIG. 12 shows a version of the co-axial, perforated trays 201, shaped as cut cylinders, where all trays are parallel to the gas duct's 2 wall. The arrangement is otherwise as in FIGS. 10 and 11 except that the part of trays to the right (or downstream) of the imaginary line 210 can play no intended part in the mass transfer since treating liquid 201 introduced to the right of this line would eventually be carried off the trays and thus be lost due to the axial velocity effect of the gas 1. The cylindrical trays could also benefit from mounting back drip collection lips 208,209 as explained in FIG. 11 above, but in this case there is an equal case for using it at both ends of the tray.

Figure 13:
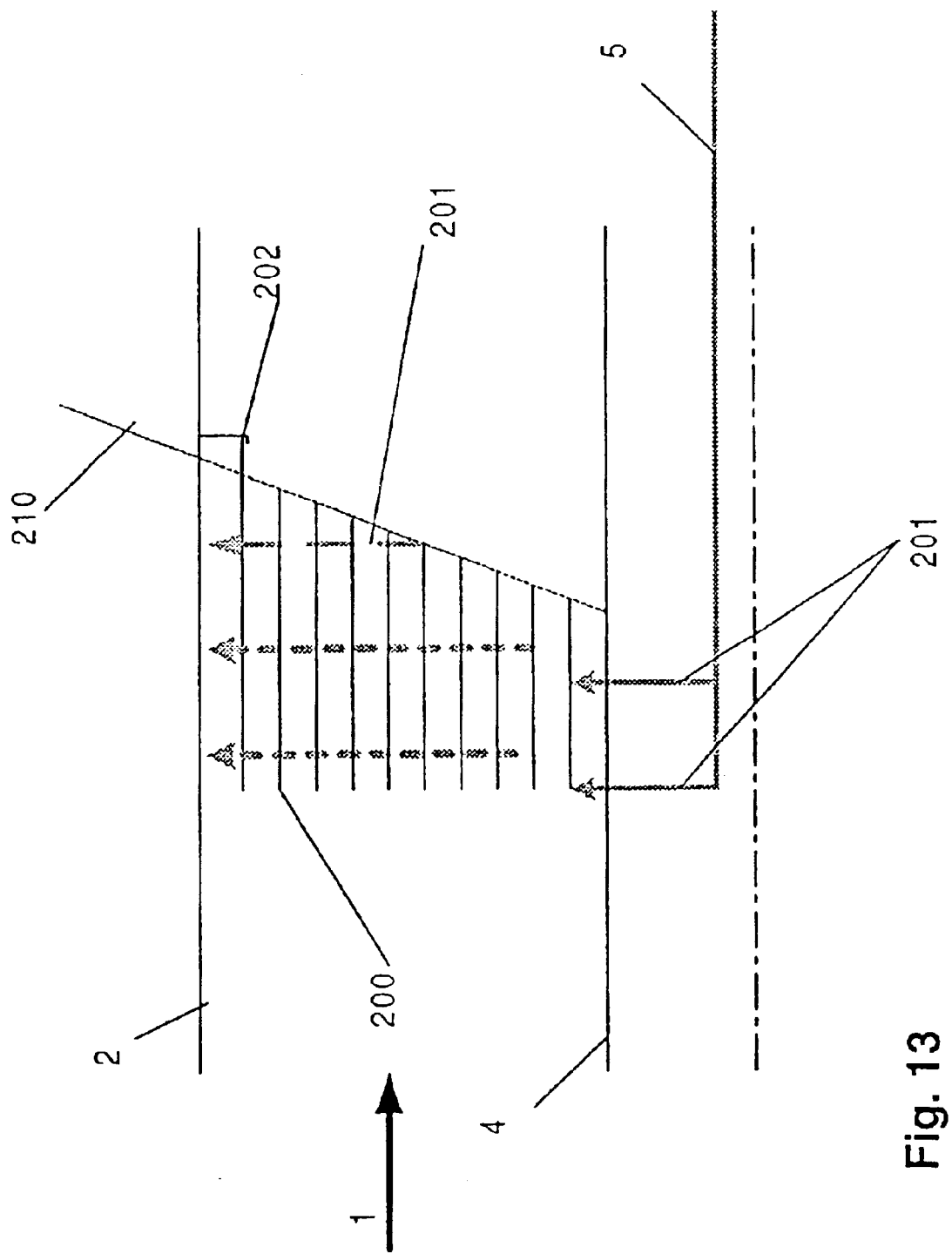
FIG. 13 shows a variation of FIG. 12.

FIG. 13 shows a version of the trays as described in FIG. 12 except that the non-effective part of the trays 201 has been removed, thus saving weight and material.

Figure 14:
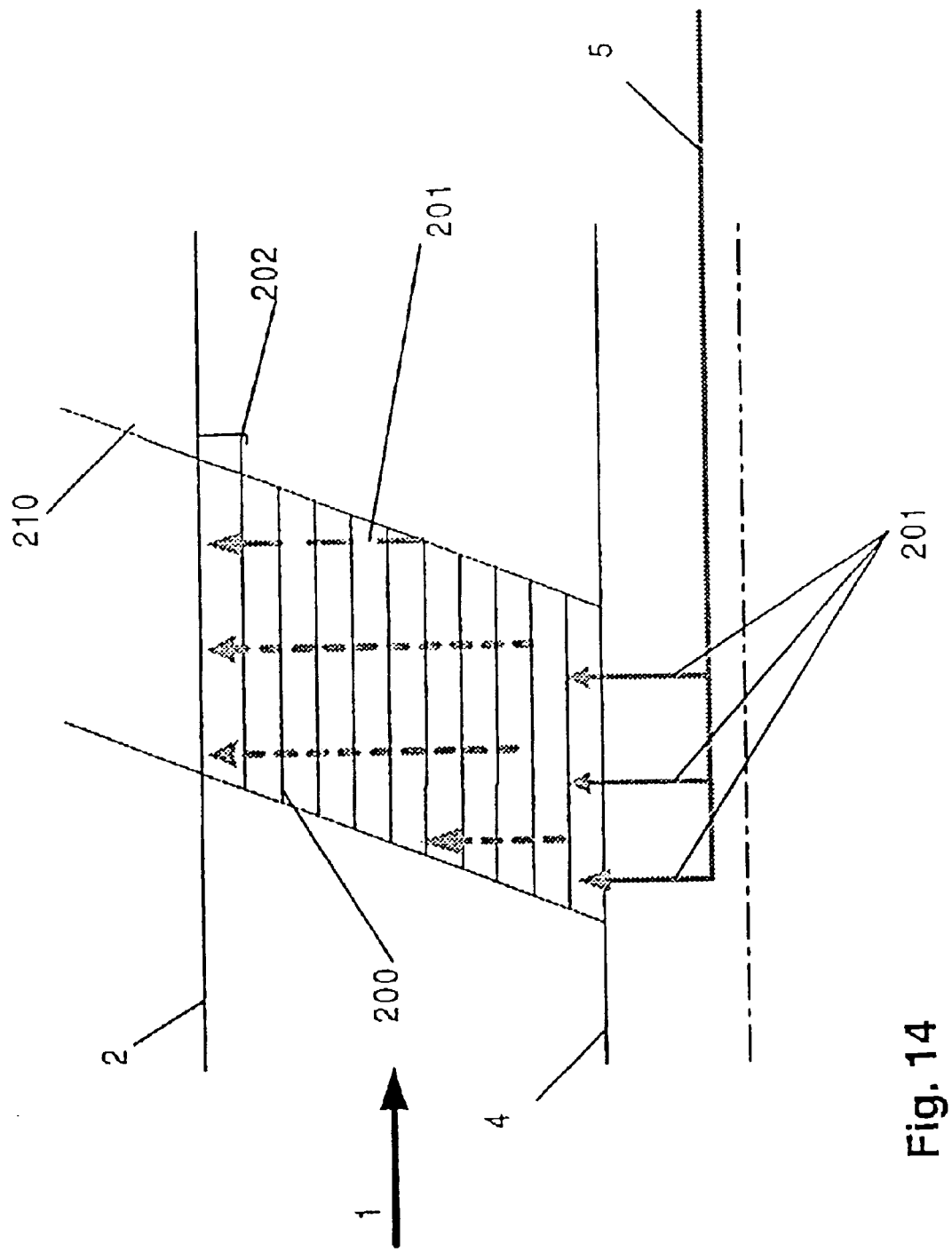
FIG. 14 shows another variation of FIG. 12.

FIG. 14 shows another version of the trays described in FIGS. 12, and 13 where the trays 200 are now staggered as shown. The staggering line 210 is determined by the axial velocity of the gas 1 and the time it takes the treating liquid 201 to traverse the gap from one tray 200 to the next. This arrangement allows constructing the trays in the simpler cylindrical shape while enabling equal active length of trays at all duct cross-sections where the gas 1 and the treating liquid 201 are contacted for mass transfer, and the treating liquid is thus not swept off the trays in the axial direction. There may still be entrainment as in conventional equipment. This embodiment allows downstream functional elements to have its central part overlapping with the peripheral part of its upstream (with respect to gas flow) neighbour.

Although the trays 200 depicted in FIGS. 10 and 12 to 14 will have similar performance with respect to mass transfer, it is clear that the flow pattern of the treating liquid will differ. The version depicted in FIG. 10 has the advantage that liquid dragged downstream by the gas will be moved back upstream in the gas by the centrifugal action of the cut cone shaped trays. This embodiment has the disadvantage that the distance the liquid is carried by gas depends on the gas velocity. Hence, if there is a turndown in the gas load, the rotational speed of the trays may need adjustment to prevent liquid from being flung off the trays on the upstream side even if said back drip collection lips are fitted. The version in FIG. 14 has the freedom to adjust the rotational speed without influencing the axial movement of the liquid, but it also has liquid coming off the trays if the gas velocity is altered sufficiently, thus making a case for mounting said back drip collection lips. The dynamics associated with turndown and turn-up of load, and/or new so-called steady states, will further complicate the issues of this discussion. For example, the centrifugal effect will vary with rotational speed and distance from the center.

FIGS. 15a, b, c, and d show an arrangement where grooves are made in the trays in such a way that the grooves aid the axial movement of the gas. The pattern of the grooves 225 may be either blade pattern as depicted in FIG. 2 or the spiral vane pattern depicted in FIG. 3. Two shapes of the cross-section of the inverted grooves 227 are shown in 15c and 15d. The grooves do not need to be continuous, and they may also be intermittent and shaped into a blade pattern as shown in FIG. 2.

Figure 16:
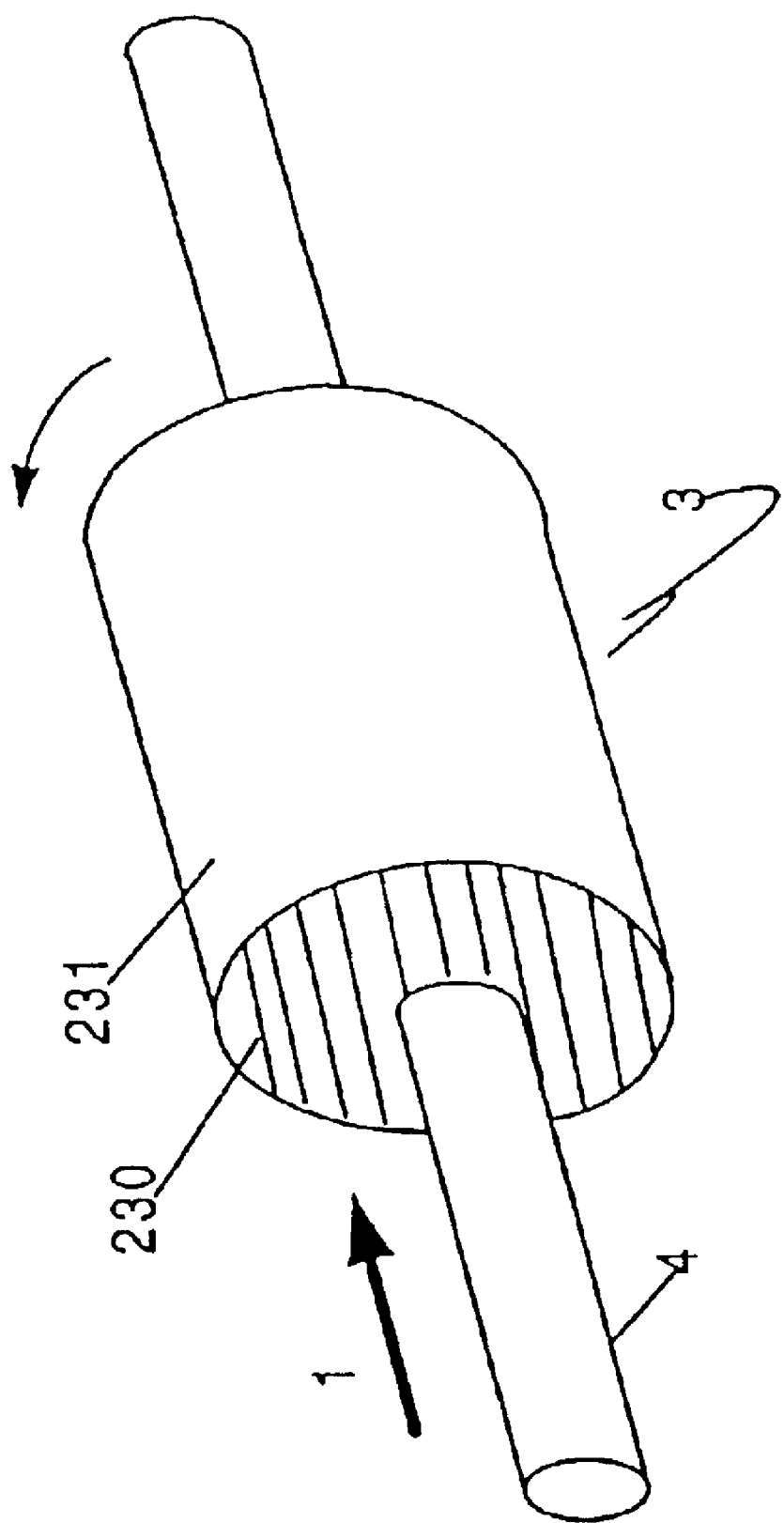
FIG. 16 shows one embodiment of the packed absorber in FIG. 15.

FIG. 16 shows a different approach to building a gas treating entity 3 based on a functional element for mass transfer consisting of a packing 230 where the gas 1 moves axially and the auxiliary liquid (not shown) moves radially as in the previous figures. As before, the functional element is mounted on the hollow axle 4. The packing is held in place by an outer perforated tray, or plate 231. More than one layer of such packing and perforated plate could be foreseen.

FIGS. 17a and 17b show how the packing 230 in FIG. 16 may be layered with perforated trays 200 between layers. The end view is shown in FIG. 17a, and the side view is shown in FIG. 17b. The curved lines 246 shall be interpreted as either open channels or baffles perpendicularly to the tray 200 placed there to provide a screwing effect on the gas to aid its axial movement.

FIGS. 18 to 22 show different embodiments of the functional elements utilized for mist removal.

Figure 18:
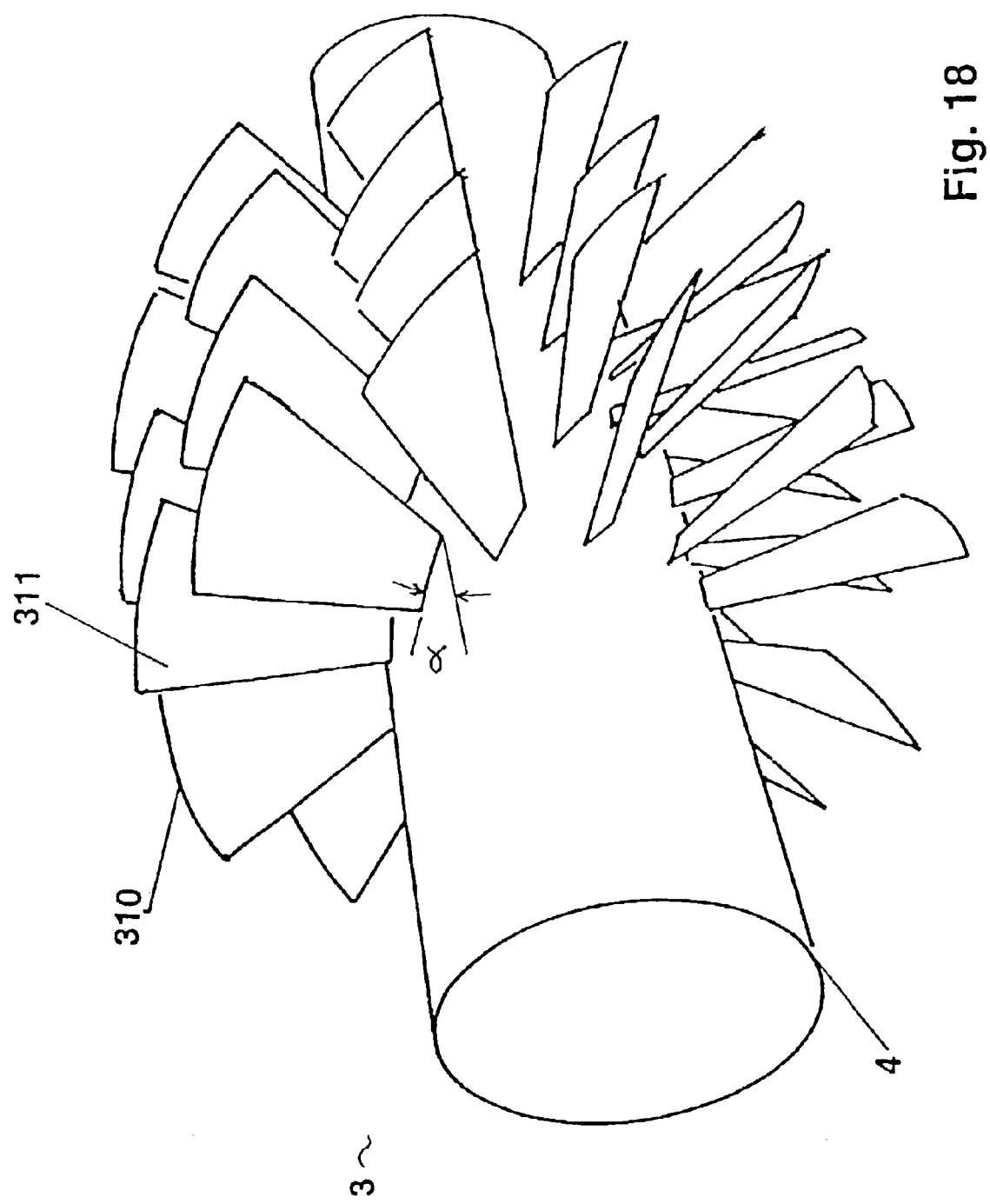
FIG. 18 shows one embodiment of the functional elements utilised for mist removal.

FIG. 18 depicts a first embodiment of a demister according to the invention. The functional element 310 may be built in the form of fan blade shapes as indicated, and the surface 311, preferably the surface facing the oncoming gas, may be covered or consist of some form of mat. This could be e.g. a sheet with pins projected like an "Astroturf doormat", or a sheet covered by a knitted thread structure like "Knit-Mesh" or a similar product. The embodiment is otherwise as described above, with particular reference to FIG. 2. Furthermore, the surface 11 of the blade-shaped heat exchange elements 10 shown in FIG. 2 may also be covered with mats having projecting pins or a sheet of knitted threads.

Figure 19:
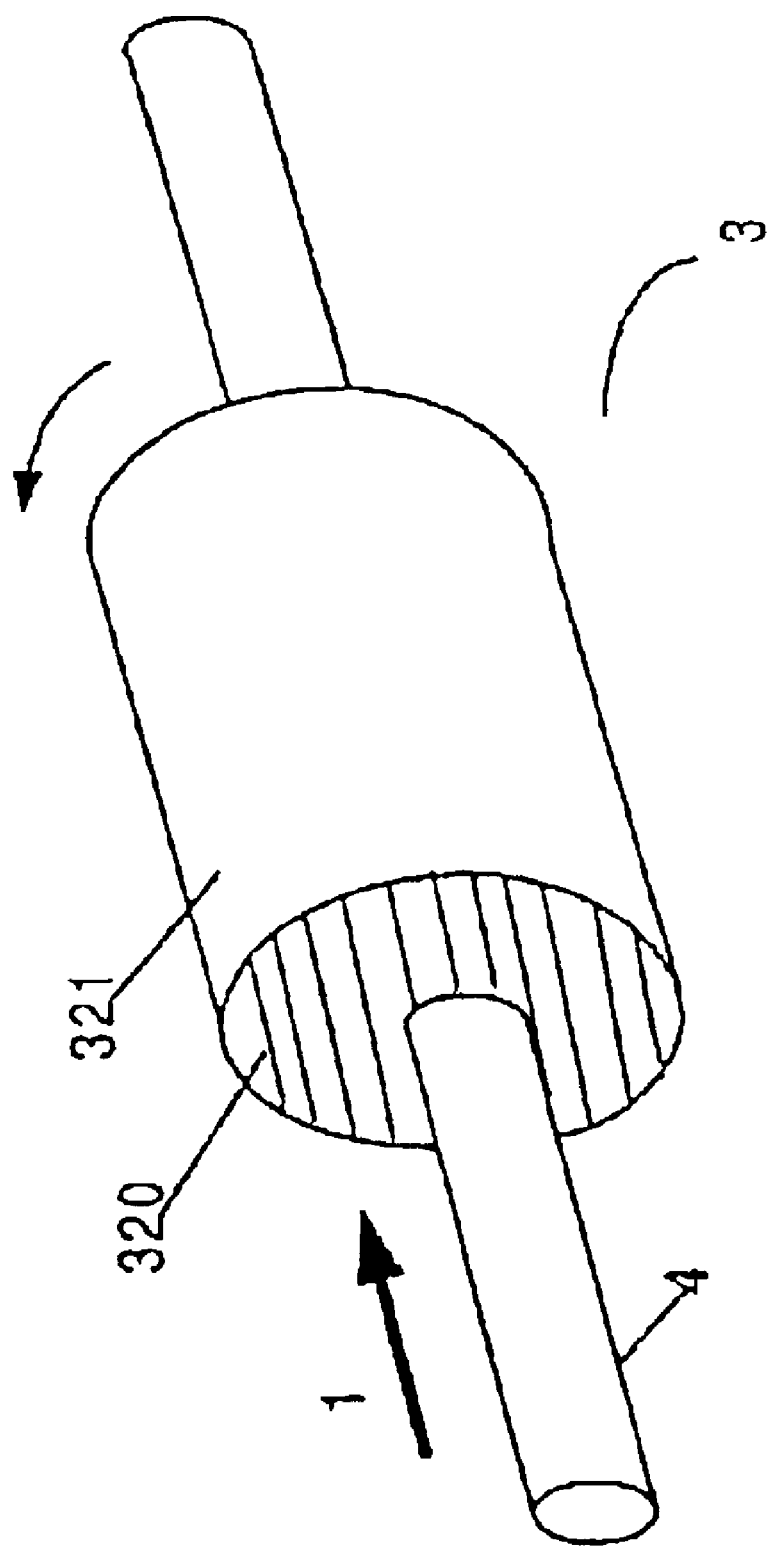
FIG. 19 shows another embodiment of the functional elements utilised for mist removal.

FIG. 19 depicts how a porous packing 320 may be fixed around the axle 4. The outer surface of the packing 320 may be finished off by having a layer 321 to keep the packing in place and/or to collect liquid caught and drained towards the periphery. The layer could be perforated to let the said liquid drip or be thrown towards the duct wall in which the assembly is mounted. The use of a non-perforated layer will be described below, with particular reference to FIG. 22. It is feasible to shape the porous element 320 such that it makes up a spiral shaped void enclosed by the element material, the hollow axle 4, and the outer layer 321. This approach has already been described above for packed mass transfer packings (FIG. 17).

Figure 20:
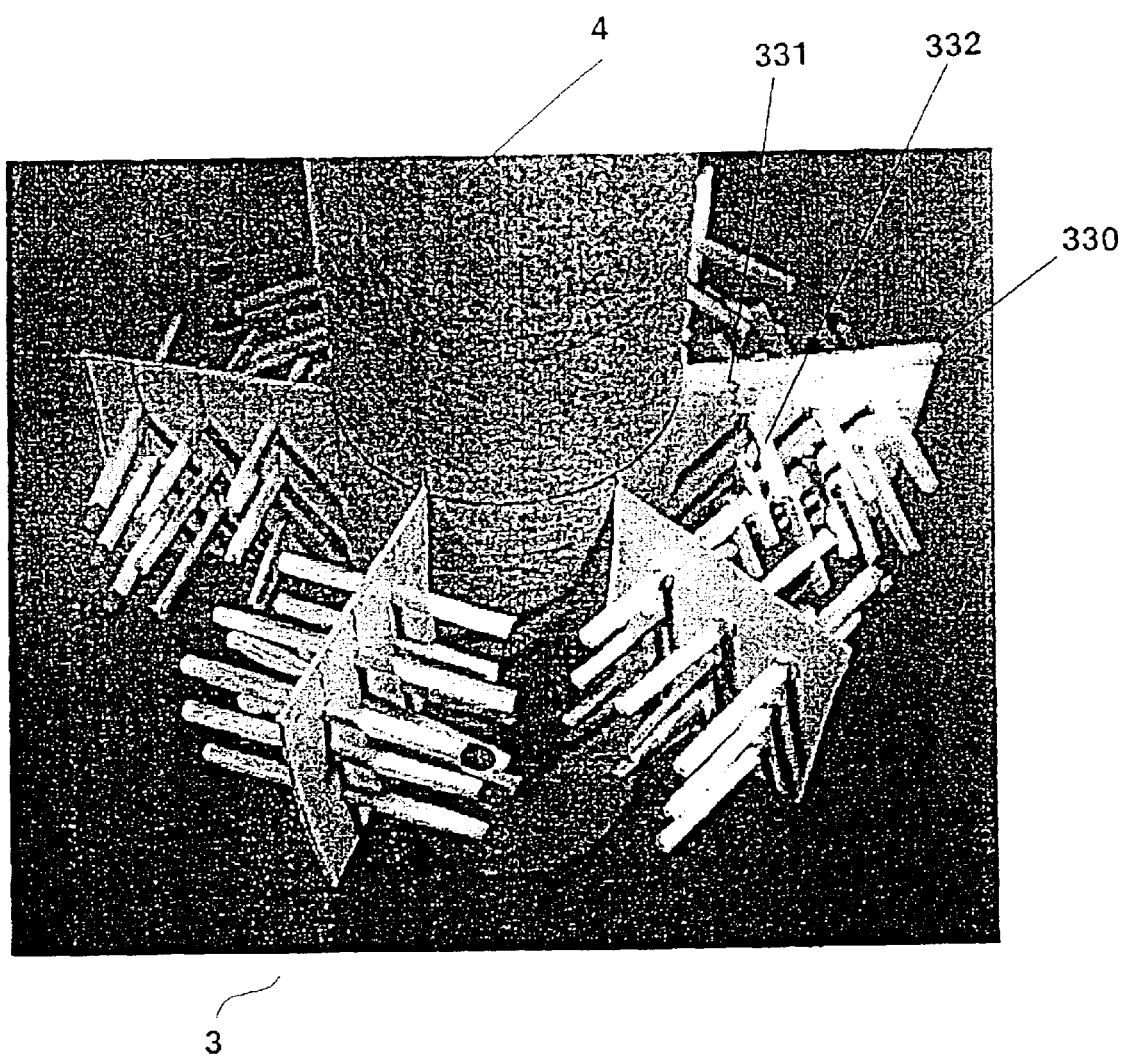
FIG. 20 shows a photograph that depicts one embodiment of the functional elements.
Figure 21:
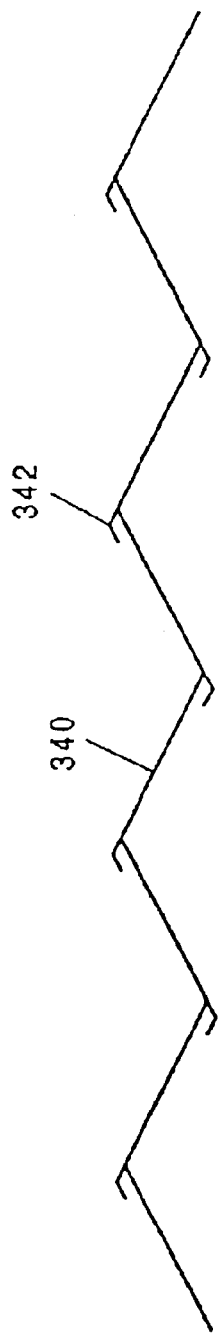
FIGS. 21A and 21B show possible shapes of blades in FIG. 2 or the spiral body from FIG. 3.
Figure 21:
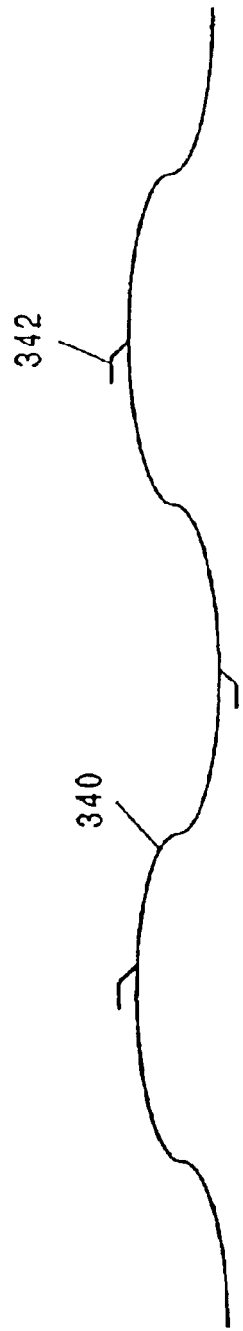

FIG. 20 is a photograph that depicts a three dimensional model of an entity 3, made from cardboard and matches, of a functional element 330 where there are primary wings 331 fixed to the axle 4. From these primary wings secondary elements 332 project to maximize the probability of entrained liquid droplets colliding with the functional element and there coalesce with other collected droplets before being flung towards the outer periphery where the liquid will eventually go to the duct wall where it will drain. Tertiary structures may be attached to the secondary structures, and these tertiary structures may be flexible, optionally like a mop.

FIGS. 21a and 21b depict possible shapes of blades from FIG. 2 or the spiral vane from FIG. 3. The view is in a plane parallel to the axle surface without attempting to show any curvature or perspective. The shaped blades or spiral vanes may be either curved (FIG. 21b) or straight lined (FIG. 21a) surfaces 340. Typically drainage channels 342 are fitted at the most protruding points. The latter is in common with standard wave plate (chevron) demisters.

Figure 22:
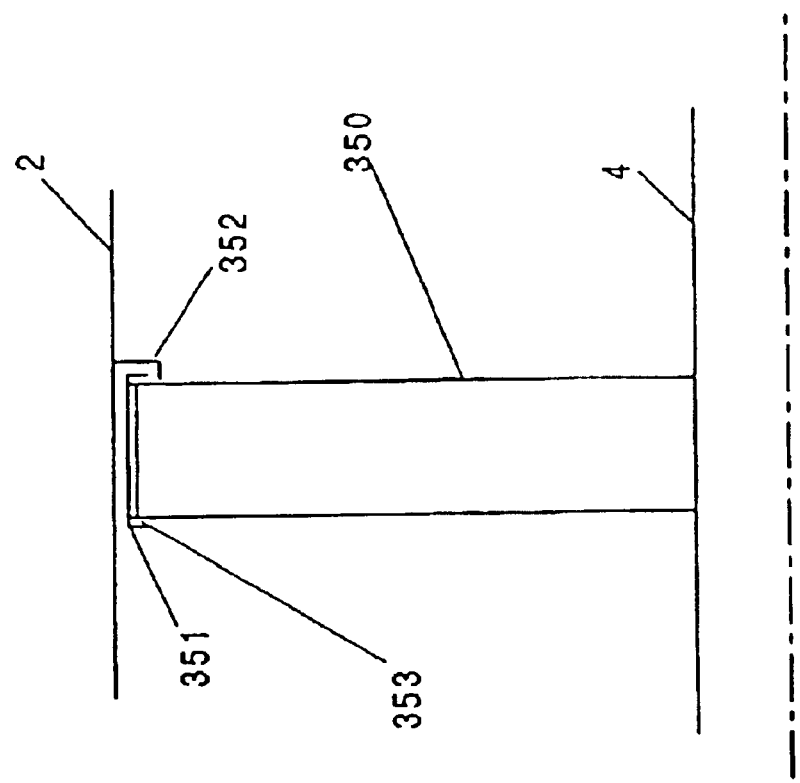
FIGS. 22–23 show how liquid collected at the outer perimeter can be drained towards the bottom of the duct.

FIG. 22 depicts how a functional element may be designed to be used as a demister device 350. It is mounted on the axle 4 as before and the element is finished off with a perforated layer 351 outermost on its periphery. Further, it is shown how that layer is bent back to form a basin 353 (since the mass force field is always radially outwards) over the downstream edge of which is placed a lip 352 to catch any liquid spilling over and lead that to drainage. It should be clear that the features described in FIG. 22 are also applicable for other functional elements, including some used for heat and mass transfer.

Figure 23:
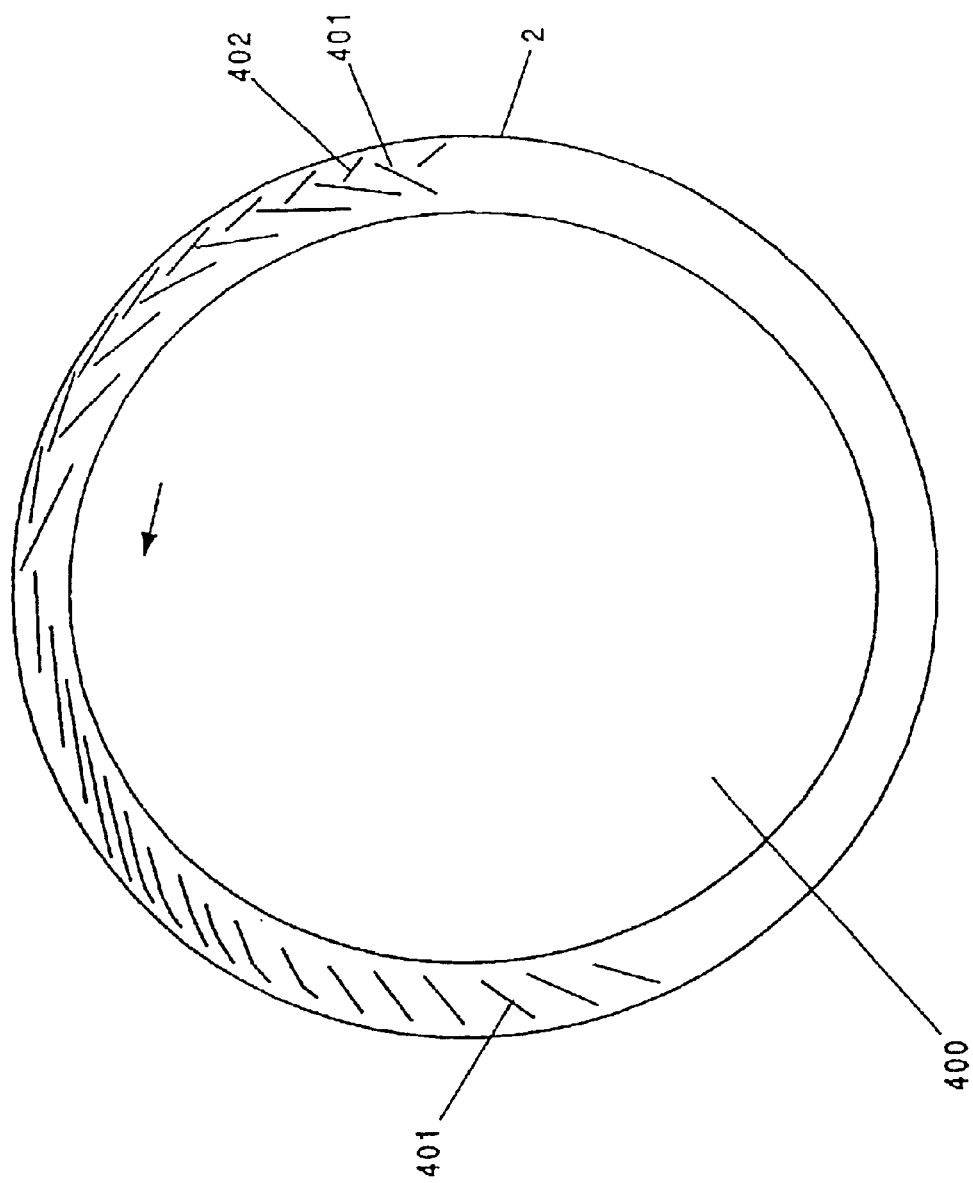

FIG. 23 shows a further technical solution with respect to how liquid collecting at the outer perimeter can be drained towards the bottom of the duct. It is shown how vanes 401 may be mounted around the periphery of the gas duct 2. The angle of the vanes is such that the vanes lie on or a few degrees off the tangent that may be drawn from the rotating functional element 400. This implies that liquid drops flung off the rotating element will be directed between the vanes or land on them.

The drops will then either hit the duct wall 2 directly or drip onto there from the vanes, possibly via secondary vanes 402. On the side where the functional element's periphery moves upwards there is optionally a double set of vanes. The set closest to the element is placed as described above (401), but the second set (402) closest to the duct wall is angled the other way to lead the liquid as far as possible towards the duct wall where it will drain. This arrangement minimizes the liquid dripping from the duct wall to the functional elements only to be flung back to the wall.

By placing all primary gas processing equipment inside a gas duct, there is by definition no piping between processing equipment. Hence the piping costs are reduced. Since the usual contractions and expansions of gas flow cross-sectional area due to flow from vessel to pipe and from pipe to vessel are removed, pressure drop in the process is also reduced. By adding fan action to the processing equipment, isobaric processing may be achieved. The transfer of heat and mass is intensified through the increased turbulence around the functional elements caused by the rotation of the assembly. The units of processing equipment have been shrunk through this intensification of the process.

What is claimed is:

1. A device for removal of carbon dioxide from an exhaust gas stream, said device to be mounted inside an exhaust gas channel and comprising:
   one or more heat exchange elements arranged to cool said exhaust gas to absorption temperature as necessary,
   one or more absorption elements arranged to absorb carbon dioxide from said exhaust gas stream,
   one or more demisting elements arranged to collect and drain liquid droplets entrained in said gas,
   a hollow axle which is arranged for rotary movement and mounted in parallel and concentrically to the axis of said channel and where said elements are attached to said axle in a successive manner,
   one or more pipes mounted axially inside said hollow axle to convey auxiliary fluid(s) to and from said elements as necessary.

2. A device according to claim 1, wherein said elements have at least one of a shape and a mounting pattern that aid the axial movement of the gas stream in the gas duct and contributes to eliminate the pressure drop induced by the presence of the element in the gas duct through imparting some axial force on the gas.

3. A device according to claim 1, wherein the heat exchange element has a fan blade shape or a spiral vane shape, such that said elements make up a blade or spiral shaped mounting pattern.

4. A device according to claim 1, wherein the heat exchange element has an essentially U-tube shave.

5. A device according to claim 4, wherein the U-tube has fins which have internal channels.

6. A device according to claim 1, wherein the heat exchange element has a lattice shape in which the number of channels in parallel increases towards the perimeter of the gas duct and decreases towards the axle.

7. A device according to claim 1, wherein the heat exchange element is blade shaped with internal channels.

8. A device according to claim 1, wherein the heat exchange elements are given a surface treatment to enhance heat transfer rates through a process selected from a group consisting of etching, grooving, fixing metal droplets and fixing metal particles.

9. A device according to claim 1, wherein the heat exchange element has a leg for feeding necessary auxiliary fluid and a leg for returning said fluid to effect the gas treatment, in which the legs are placed separately in at least two different planes.

10. A device according to claim 1, wherein the heat exchange element comprises blade shapes that are covered with mats that have projecting pins or sheet of knitted threads.

11. A device according to claim 1, wherein the absorption element is a set of perforated co-axial cylinders or a set of perforated co-axial cut cones, in which co-axially refers to the axis of the device.

12. A device according to claim 1, wherein the cylinders or cut cones are modified by inserting grooves in said cylinders or cones in such configuration that said grooves make up a pattern like blades or spiral vanes.

13. A device according to claim 1, wherein the absorption element is a packing where the gas moves axially and the auxiliary liquid moves radially.

14. A device according to claim 1, wherein a ring having a lip is mounted at the perimeter of a duct for the exhaust gas to catch fluid flowing along the duct wall and drain it to the bottom of the duct where it can be drawn off by gravity.

15. A device according to claim 11, wherein a lip is fitted to the front or the back end of the co-axial cylinders or cut-cones to catch treating liquid spilling off the cylinder or tray and redirect it back on to said cylinders or cones.

16. A device according to claim 1, wherein the mist removal element has a fan blade shape or a spiral vane shape such that said elements make up a blade shaped or a spiral shaped mounting pattern.

17. A device according to claim 1, wherein the mist removal element has a vane-shape and is mounted on the axle in a spiral shaped pattern and said vane has a wave-shape in which the wave top traverses the direction of the vane, and peaks of said vane have open, radial channels that aid the draining of gathered droplets towards the perimeter.

18. A device according to claim 1, wherein the mist removal element comprises blade shapes that are covered with mats that have projecting pins or sheet of knitted threads.

19. A device according to claim 1, wherein the element for mist removal is a packing where the gas moves axially and the collected liquid moves radially.

20. A method of removing carbon dioxide from an exhaust gas stream, wherein said method is performed within the confines of an exhaust gas channel and comprises feeding said gas stream to one or more heat exchange elements to be cooled to absorption temperature as necessary, feeding said cooled gas stream to one or more absorption elements that absorb carbon dioxide from said exhaust gas stream by passing an absorbent radially from the center of said absorption element by centrifugal force to the periphery of said element where the absorbent rich in $CO_2$ is collected and recycled and a $CO_2$-depleted exhaust gas stream is obtained, and conducting said $CO_2$-depleted exhaust gas stream to one or more demisting elements where liquid droplets entrained in said gas stream are collected and drained to the periphery by centrifugal force.

21. A method according to claim 20, wherein the gas stream flows countercurrent to the auxiliary fluids.

22. A method according to claim 20, wherein the gas stream flows axially in the duct and is treated with a fluid flowing radially.

23. A device according to claim 3, wherein the heat exchange element is blade shaped with internal channels.

* * * * *